United States Patent [19]
Okimoto et al.

[11] Patent Number: 5,440,485
[45] Date of Patent: Aug. 8, 1995

[54] STARTING APPARATUS OF PASSENGER PROTECTING APPARATUS

[75] Inventors: Yukihiro Okimoto; Takashi Furui; Katsuhiko Ohmae, all of Hyogo, Japan

[73] Assignees: Mitsubishi Denki Kabushiki Kaisha, Hyogo; Mitsubishi Jidosha Kogyo Kabushiki Kaisha, Tokyo, both of Japan

[21] Appl. No.: 68,197

[22] Filed: May 28, 1993

[30] Foreign Application Priority Data

May 29, 1992 [JP] Japan ................................ 4-161643

[51] Int. Cl.⁶ ...................... B60R 21/12; B60R 21/32
[52] U.S. Cl. ............... 364/424.05; 340/436; 307/10.1; 280/735; 180/274
[58] Field of Search ................ 364/424.05; 340/436, 340/437, 438; 280/735; 180/274; 307/10.1

[56] References Cited

U.S. PATENT DOCUMENTS

| | | | |
|---|---|---|---|
| 4,410,875 | 10/1983 | Spies et al. | 180/274 |
| 5,083,276 | 1/1992 | Okano et al. | 364/424.05 |
| 5,173,614 | 12/1992 | Woehrl et al. | 307/10.1 |
| 5,208,484 | 5/1993 | Okano et al. | 307/10.1 |
| 5,229,943 | 7/1993 | Eigler et al. | 364/424.05 |
| 5,256,904 | 10/1993 | Tohbaru | 307/10.1 |

FOREIGN PATENT DOCUMENTS 548574  2/1984  Japan .

Primary Examiner—Kevin J. Teska
Assistant Examiner—Tyrone V. Walker

[57] ABSTRACT

A starting apparatus of a passenger protecting apparatus is actuated by detecting collision of a vehicle. The starting apparatus is provided so as to subtract a predetermined value from an acceleration signal fed from G sensor and integrate the subtracted acceleration signal, and forcedly set an integrated value to zero if the integrated value is less than zero. Further, the starting apparatus is provided so as to provide a starting signal when the integrated value exceeds a preset threshold value. Therefore, it is possible to discriminate collision to start the apparatus from other collision, prevent starting means from being unnecessarily actuated, and avoid malfunction of the starting means.

5 Claims, 26 Drawing Sheets

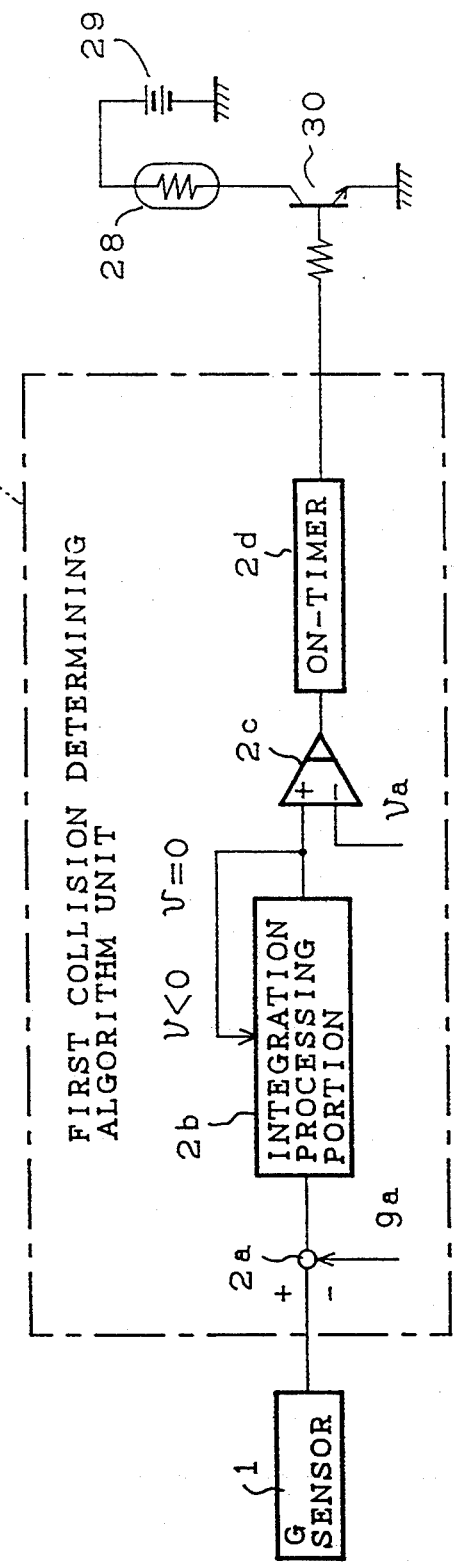
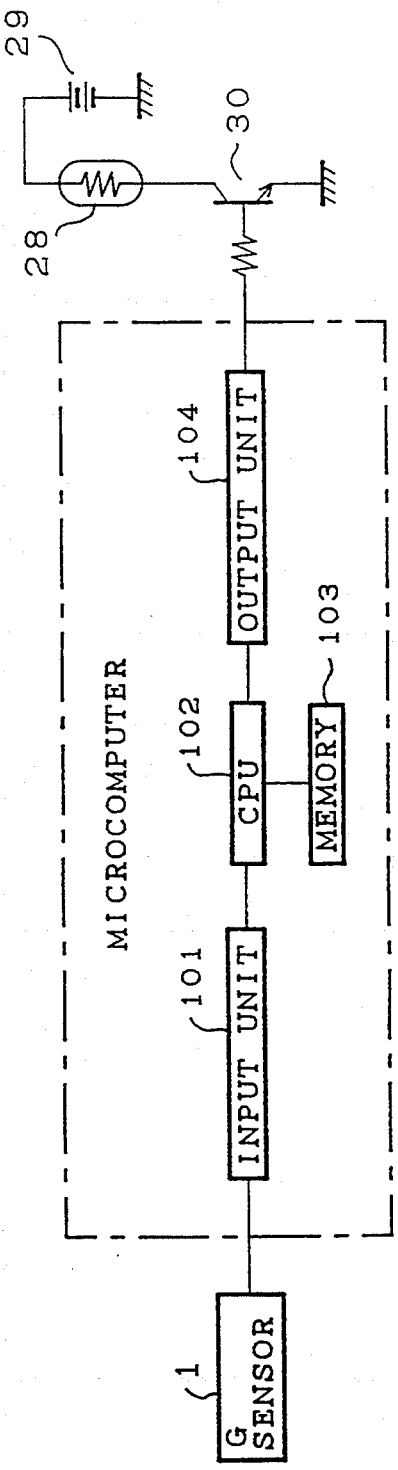

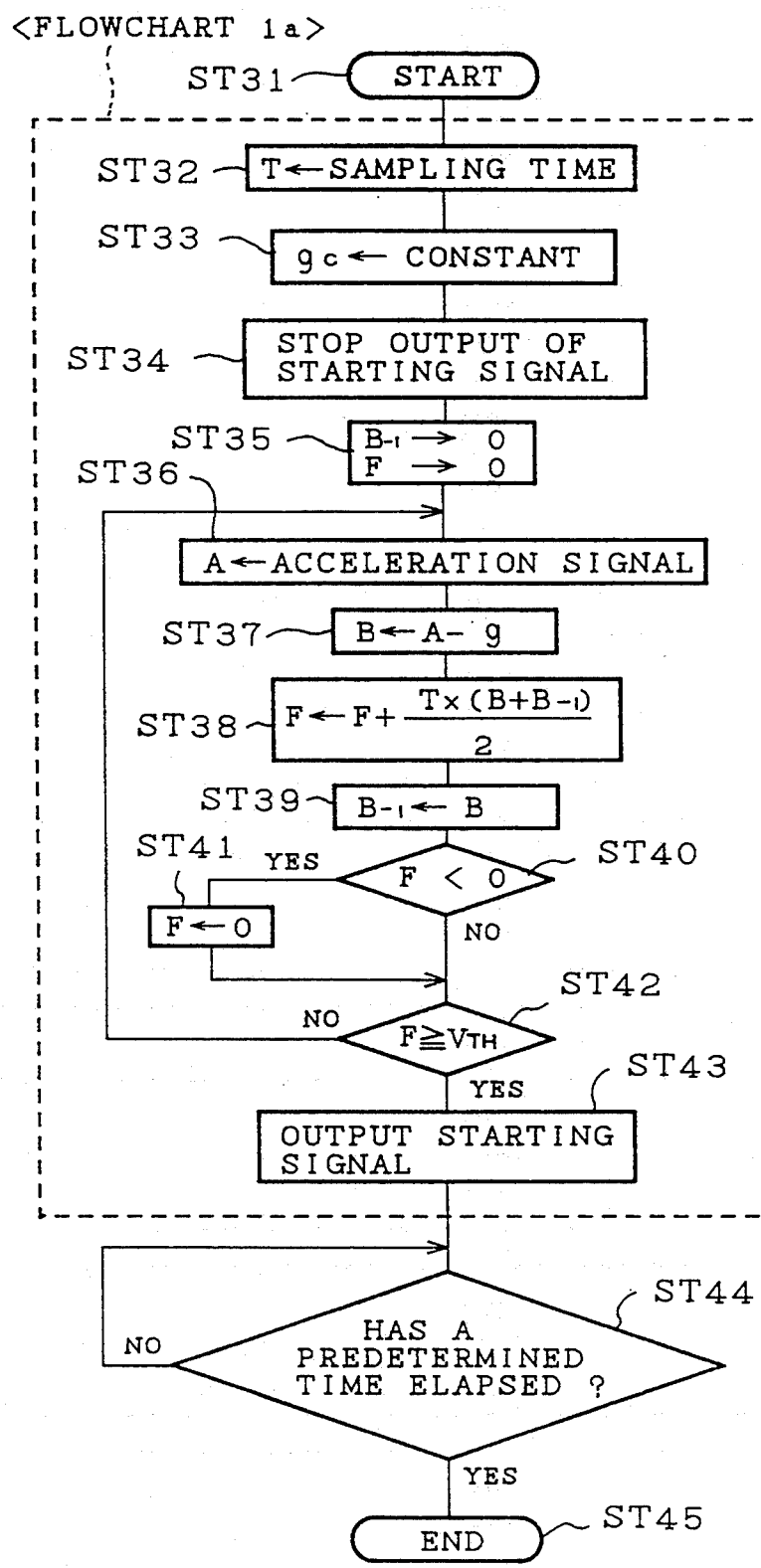

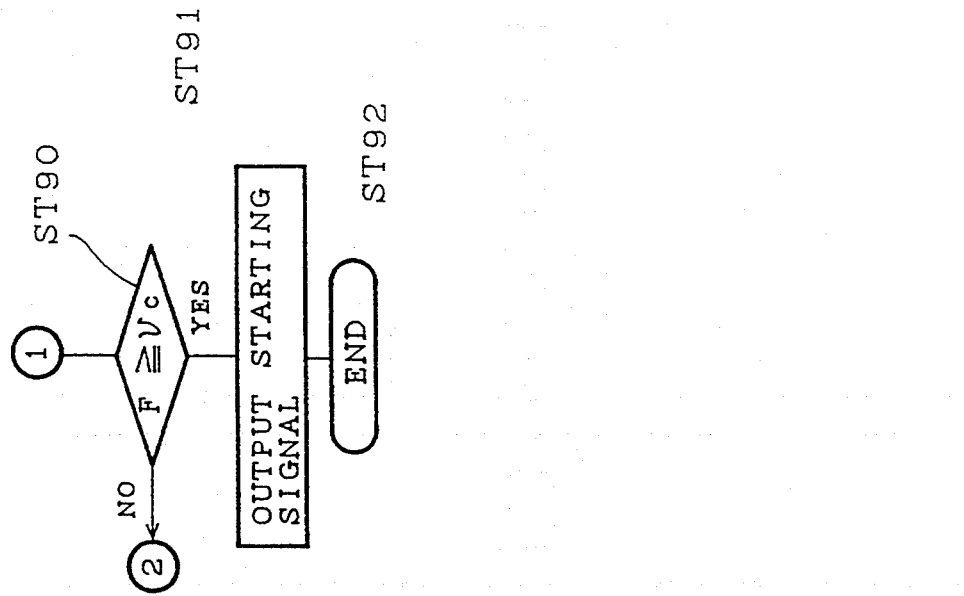
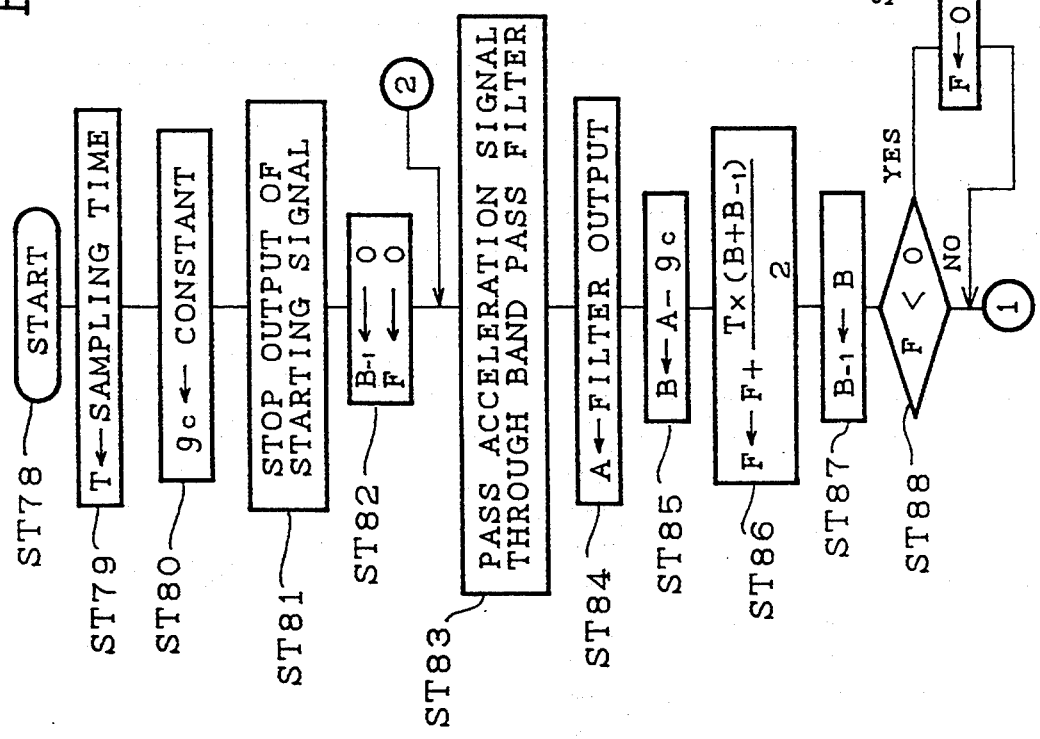
FIG. 11

STARTING APPARATUS OF PASSENGER PROTECTING APPARATUS

BACKGROUND OF THE INVENTION

1. Field of the Invention

The present invention relates to a starting apparatus of a passenger protecting apparatus such as air bag or seat belt pretensioner, which is actuated by detecting collision of a vehicle.

2. Description of the Prior Art

FIG. 1 is a block diagram showing a conventional air bag starting control unit which is disclosed in, for example, Japanese Patent Application Publication No. 59-8574. In FIG. 1, reference numeral 1 means an acceleration sensor (hereafter abbreviated as G sensor), 155 is an integrating circuit for integrating an acceleration signal output from the G sensor 1, and 156, 159 are comparator circuits for comparing an output from the integrating circuit 155 with starting prediction levels $V_1$ and $V_2$. Further, reference numeral 157 means a time constant circuit including a diode $D_2$, a resistor $R_2$ and a capacitor $C_2$, and 158 is a comparator circuit for comparing an output from the time constant circuit 157 with the output from the integrating circuit 155. Reference numeral 160 means a reset pulse oscillator receiving an output from the comparator 159 as an input, 161 is a differentiating circuit including a capacitor $C_1$ and a resistor $R_1$, and $D_1$ is a diode for supply an output from the differentiating circuit 161 to an input terminal of the integrating circuit 155.

A description will now be given of the operation of the prior art apparatus. At a time of collision of a vehicle, the G sensor 1 converts acceleration into an electrical acceleration signal, and the acceleration signal is integrated and converted into a speed signal by the integrating circuit 155. Typically, the integrating circuit 155 is reset for each predetermined cycle by an output signal from the pulse oscillator 160, and a starting signal is output if the output from the integrating circuit 155 exceeds the starting prediction level of the comparator circuit 158.

However, if the output from the integrating circuit 155 exceeds the starting prediction level of the comparator circuit 159, the output drops so as to extend the cycle of the pulse oscillator 160, and passes through the differentiating circuit 161, resulting in an extended cycle of reset pulse for the integrating circuit 155.

Further, the output from the integrating circuit 155 varies the starting prediction level of the comparator circuit 158 through the comparator circuit 156 and the time constant circuit 157. In case the output from the integrating circuit 155 exceeds the starting prediction level, the comparator circuit 158 outputs a starting signal so as to avoid malfunction when receiving impact which has no need to start the starting apparatus of the passenger protecting apparatus.

The starting apparatus of the passenger protecting apparatus in the prior art is provided as set forth above. Accordingly, there are some drawbacks in that a circuit for generating a trigger is required to reset the integrating circuit within a predetermined period, and a time delay generated by the trigger circuit causes another time delay required to generate the starting signal. Further, there is another drawback in that the passenger protecting apparatus may be unnecessarily started by, for example, rough road travelling (i.e., travelling other than the collision such as running onto a curb) due to indistinctness in a difference between the rough road travelling and head-on collision at a low speed if the starting apparatus is started by only the acceleration signal at the time of the collision of the vehicle. There is still another disadvantage of difficulty of discriminating between the head-on collision at the low speed (i.e., collision having no need to start the passenger protecting apparatus) and special collision (i.e., collision requiring starting of the passenger protecting apparatus) such as slipping under a rear deck of a truck.

SUMMARY OF THE INVENTION

In view of the foregoing, it is an object of the present invention to provide a starting apparatus of a passenger protecting apparatus which can discriminate between acceleration applied due to conditions other than collision or low speed collision (i.e., collision having no need to start the passenger protecting apparatus) and collision to start the passenger protecting apparatus so as not to unnecessarily actuate the starting apparatus, and thereby avoid malfunction of the starting apparatus.

It is another object of the present invention to provide a starting apparatus of a passenger protecting apparatus which can reduce a collision determining time so as to be less than that of a conventional starting apparatus.

It is still another object of the present invention to provided a starting apparatus of a passenger protecting apparatus which can determine at the time of high speed collision more accurately than the conventional starting apparatus.

It is still another object of the present invention to provide a starting apparatus of a passenger protecting apparatus which can extract characteristics of acceleration signal waveforms of head-on collision at a low speed and head-on collision at a high speed so as to discriminate therebetween.

It is still another object of the present invention to provide a starting apparatus of a passenger protecting apparatus which can discriminate between rough road travelling and special collision with higher reliability than that of the conventional starting apparatus.

It is still another object of the present invention to provide a starting apparatus of a passenger protecting apparatus which can discriminate between the high speed collision and the rough road travelling and the special collision with respect to all conditions requiring a decision, such as collision or rough road travelling, with higher reliability than that of the conventional starting apparatus.

According to the first aspect of the present invention, for achieving the above-mentioned objects, there is provided a starting apparatus of a passenger protecting apparatus including a first collision determining algorithm unit for setting a speed signal to zero if the speed signal obtained by integrating an acceleration signal is less than zero when sequentially integrating after subtracting a constant value from the acceleration signal. The starting apparatus outputs a starting signal depending upon an output from the first collision determining algorithm unit.

Consequently, in the starting apparatus of the passenger protecting apparatus according to the first aspect of the present invention, the first collision determining algorithm unit is provided to integrate with the speed signal defined as zero if the speed signal obtained by integrating after subtracting the constant value from the acceleration signal is less than zero whereby it is possible to omit a trigger circuit for resetting of an integrating circuit, and reduce a collision determining time.

According to the second aspect of the present invention, there is provided a starting apparatus of a passenger protecting apparatus including a second collision determining algorithm unit having the first collision determining algorithm unit on the first stage for outputting in response to an acceleration signal at the time of the low speed collision, the first collision determining algorithm unit on the second stage for outputting in response to the acceleration signal at the time of the high speed collision, and an AND circuit obtaining the AND of both outputs from the respective first collision determining algorithm units. Thus, the starting apparatus outputs a starting signal depending upon the output from the second collision determining algorithm unit.

Consequently, in the starting apparatus of the starting apparatus of the passenger protecting apparatus according to the second aspect, there is provided the second collision determining algorithm unit having the first collision determining algorithm unit on the first stage, the first collision determining algorithm unit on the second stage for outputting at the time of high speed collision, and the AND circuit obtaining the AND of both the outputs from the respective first collision determining algorithm units. Therefore, it is possible to further accurately determine at the time of the high speed collision.

According to the third aspect of the present invention, there is provided a starting apparatus of a passenger protecting apparatus including a third collision determining algorithm unit having a band pass filter for extracting a particular frequency component from an acceleration signal so as to feed into the first collision determining algorithm unit. Thus, the starting apparatus outputs a starting signal depending upon an output from the third collision determining algorithm unit.

Consequently, the starting apparatus of the passenger protecting apparatus according to the third aspect of the present invention is provided with the third collision determining algorithm unit employing the band pass filter on the preceding stage of the first collision determining algorithm unit. Therefore, it is possible to extract characteristics of acceleration signal waveforms of head-on collision at a low speed and head-on collision at a high speed so as to discriminate therebetween.

According to the fourth aspect of the present invention, there is provided a starting apparatus of a passenger protecting apparatus including a fourth collision determining algorithm unit having a positive acceleration signal passing portion for inputting a positive acceleration signal into the first collision determining algorithm unit on the first stage, and a negative acceleration signal inverting/passing portion for inputting a negative acceleration signal into the first collision determining algorithm unit on the second stage. Thus, the starting apparatus outputs a starting signal depending upon an output from the fourth collision determining algorithm unit.

Consequently, the starting apparatus of the passenger protecting apparatus according to the fourth aspect of the present invention is provided with the fourth collision determining algorithm unit for comparing an output of the integrated acceleration signal on the positive side with an output of the integrated acceleration signal on the negative side in the acceleration signals so as to define a more rapidly output as the starting signal.

Therefore, it is possible to discriminate the rough road travelling since an acceleration signal waveform is also formed largely on the negative side at the time of the rough road travelling.

According to the fifth aspect of the present invention, there is provided a starting apparatus of a passenger protecting apparatus including a fifth collision determining algorithm unit having an AND circuit which obtains the AND of the output from the third collision determining algorithm unit and the output from the fourth collision determining algorithm unit. The starting apparatus outputs a starting signal depending upon an output from the fifth collision determining algorithm unit.

Consequently, the starting apparatus of the passenger protecting apparatus according to the fifth aspect of the present invention is provided with the fifth collision determining algorithm unit which is a combination of the third collision determining algorithm unit and the fourth collision determining algorithm unit. Therefore, it is possible to perform a highly reliable discrimination between the rough road travelling and the special collision.

According to the sixth aspect of the present invention, there is a starting apparatus of a passenger protecting apparatus including a sixth collision determining algorithm unit having an AND circuit which obtains the AND of the output from the first collision determining algorithm unit and the output from the fifth collision determining algorithm unit. The starting apparatus outputs a starting signal depending upon an output from the sixth collision determining algorithm unit.

Consequently, the starting apparatus of the passenger protecting apparatus according to the sixth aspect of the present invention is provided with the sixth collision determining algorithm unit which is a combination of the first collision determining algorithm unit and the fifth collision determining algorithm unit. Therefore, it is possible to provide a safety function, and perform a highly reliable discrimination between the rough road travelling and the special collision.

According to the seventh aspect of the present invention, there is provided a starting apparatus of a passenger protecting apparatus including a seventh collision determining algorithm unit having an AND circuit which obtains the AND of the output from the first collision determining algorithm unit and the output from the fourth collision determining algorithm unit. Thus, the starting apparatus outputs a starting signal depending upon an output from the seventh collision determining algorithm unit.

Consequently, the starting apparatus of the passenger protecting apparatus according to the seventh aspect of the present invention is provided with the seventh collision determining algorithm unit which is a combination of the first collision determining algorithm unit and the fourth collision determining algorithm unit. Therefore, it is possible to provide a safety function, and perform a highly reliable discrimination of the rough road travelling.

According to the eighth aspect of the present invention, there is provided a starting apparatus of a passenger protecting apparatus including an eighth collision determining algorithm unit having an OR circuit which obtains the OR of the output from the second collision determining algorithm unit and the output from the sixth collision determining algorithm unit. Thus, the starting apparatus outputs a starting signal depending upon an output from the eighth collision determining algorithm unit.

Consequently, the starting apparatus of the passenger protecting apparatus according to the eighth aspect of the present invention is provided with the eighth collision determining algorithm unit which is a combination of the second collision determining algorithm unit and the sixth collision determining algorithm unit. Therefore, it is possible to perform a highly reliable discrimination between the high speed collision and the rough road travelling and the special collision among all the collisions.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 2 is a block diagram showing one embodiment of a starting apparatus of a passenger protecting apparatus according to the first aspect of the present invention;

FIG. 3 is a block diagram showing a microcomputer forming a first collision determining algorithm unit;

FIG. 4 is a flowchart illustrating the operation of the embodiment of FIG. 2;

FIG. 11 is a flowchart illustrating the operation of the embodiment of FIG. 10;

DETAILED DESCRIPTION OF THE PREFERRED EMBODIMENTS

Figure 1:
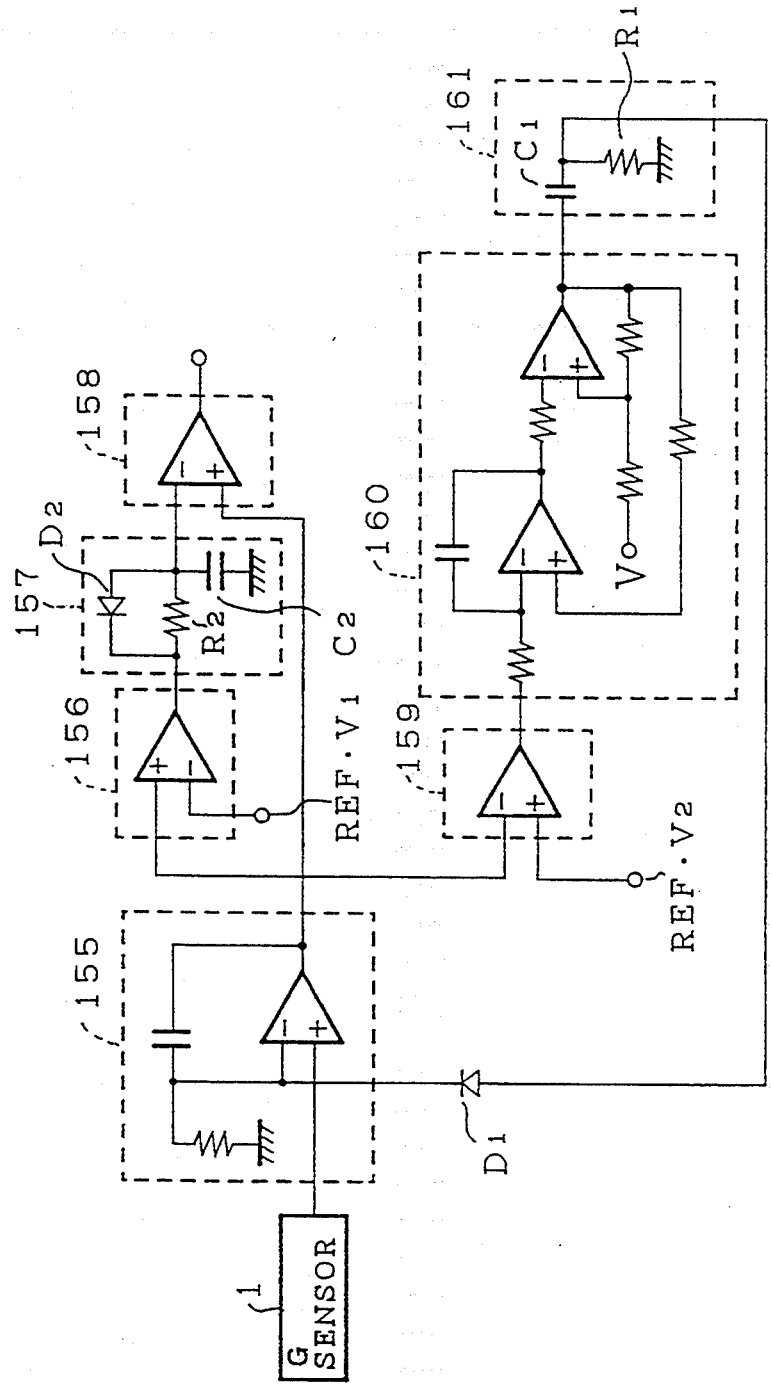
FIG. 1 is a block diagram showing a conventional starting apparatus of a passenger protecting apparatus.
Figure 5A:
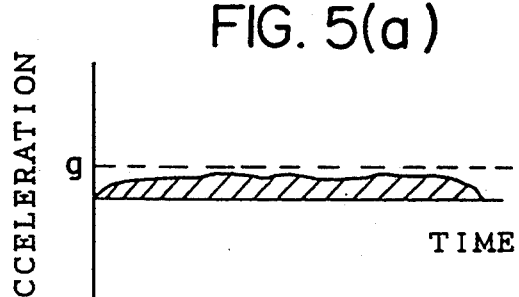
FIG. 5(a) to (e) are each signal waveform diagrams at an operative time.
Figure 5B:
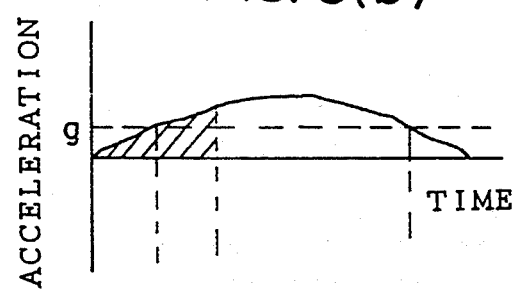
Figure 5C:
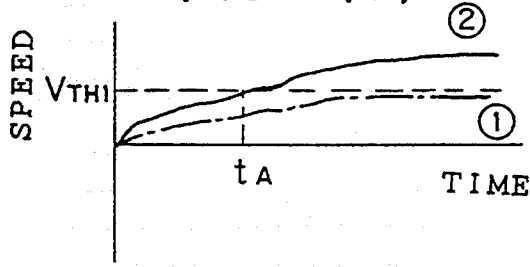
Figure 5D:
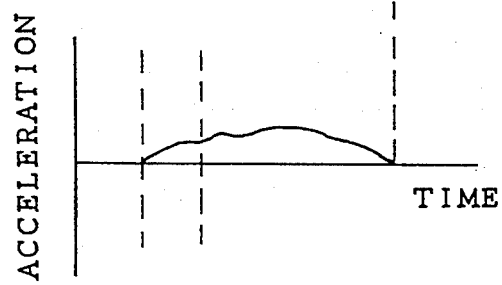
Figure 5E:
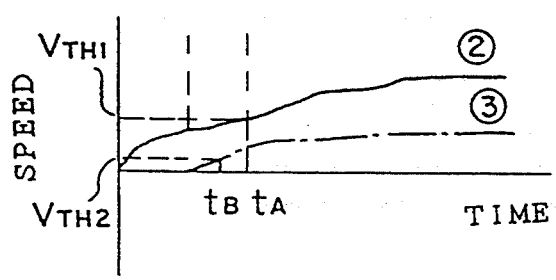

Preferred embodiments of the invention will now be described in detail referring to the accompanying drawings.

Embodiment 1

A description will now be given of the operation of one embodiment of the present invention with reference to the drawings. FIG. 2 is a block diagram showing the embodiment according to the first aspect of the present invention. In FIG. 2, reference numeral I means a first collision d termining algorithm unit including a subtraction processing portion 2a for subtracting a constant Value $g_a$ from an output of the G sensor 1, an integration processing portion 2b having a function for initializing to zero in case an integrated value F of the output from the subtraction processing portion 2a is less than zero, a comparison processing portion 2c for comparing the integrated value F with preset voltage $v_a$, and an on-timer 2d for holding an ON state for a predetermined period by receiving an output from the comparison processing portion 2c. Reference numeral 30 means a switching transistor which is conducted by receiving an output from the first collision determining algorithm unit I, and reference numeral 28 is starting means of the passenger protecting apparatus which is connected between the transistor 30 and a DC power source 29, and is referred to as "squib".

FIG. 3 illustrates the first collision determining algorithm unit shown in FIG. 2, which is formed by a microcomputer including an input unit 101, CPU 102, a memory 103, an output unit 104. Other components of FIG. 3 are identical with those of FIG. 2, and the descriptions thereof are omitted.

Next, a description will now be given of the operation of the embodiment of FIG. 2 with reference to a flowchart shown in FIG. 4. In Step ST32, a sampling time is input, and an acceleration signal having the amount of offset g is input in Step ST33. After output of a starting signal is stopped in Step ST34, the acceleration signal $B_{-1}$ preceding by one moment, and the integrated value F are initialized to zero. The acceleration signal output from the G sensor 1 is fetched, and the acceleration signal is defined as A in Step ST36. In Step ST37, the amount of offset g of the acceleration signal set in Step ST33 is subtracted from A so as to be defined as B. Subsequently, trapezoidal integration of the acceleration signal is performed in Step ST38.

In Step ST39, the value B of the current acceleration signal is input into the value $B_{-1}$ of the acceleration signal preceding by one moment so as to determine whether or not the integrated value F is less than zero. If less than zero, the operation proceeds in a direction of YES to set the integrated value F to zero in Step ST41, and the operation proceeds to Step ST42. Otherwise, if the integrated value F is greater than zero in Step ST40, the operation proceeds in a direction of NO, that is, to Step ST42. Further, if the integrated value F is less than a preset threshold value $V_{TH}$ in Step ST42, the operation proceeds in the direction of NO instead of outputting the starting signal. Thus, the operation returns to Step ST36 so as to repeat the process as set forth above.

On the other hand, if the integrated value F is greater than the threshold value $V_{TH}$ in Step ST42, it is determined that there occurs collision requiring the starting signal. Accordingly, the operation proceeds in the direction of YES so as to output the starting signal in Step ST43, and hold output of the starting signal for a predetermined period in Step ST44, and the process is terminated in Step ST45.

A description will now be given of the process with reference to waveforms shown in FIG. 5.

In FIG. 5, (a) represents a waveform of an acceleration signal in case there occurs collision at the time of travelling at a low speed (of about 10 km/h), which requires no starting signal. Further, (b) represents another waveform of an acceleration signal in case there occurs collision at the time of travelling at an intermediate or high speed (of about 50 km/h), which requires the starting signal. In FIG. 5, the amount of offset g is a value set to be greater than the acceleration waveform (a).

Reference numerals (1) and (2) in (c) respectively mean waveforms which are obtained by simply integrating the respective waveforms (a) and (b). A threshold value $V_{VH1}$ at a time when the starting signal is output is set to a value greater than that of the waveform (1). Further, a time period required for the waveform (2) reaching the threshold value $V_{VH1}$ is defined as $t_A$. Subsequently, the amount of offset g is subtracted from the waveform (a) so that the acceleration signal becomes a negative value. Similarly, the amount of offset g is subtracted from the waveform (b) to provide a waveform (d), and the waveform (d) is integrated to provide a waveform (3) in (e).

On the other hand, if the amount of offset g is subtracted from the waveform (a), the acceleration signal becomes a negative value. Accordingly, a threshold value $V_{TH2}$ can be set to a considerably lower value than the threshold value $V_{TH1}$. Further, a time period $t_B$ required for the waveform (3) in (e) reaching the threshold value $V_{TH2}$ is less than the determining time period $t_A$ of (2) showing the result of integration without subtracting the amount of offset g. As a result, it is possible to determine for a time period less than the determining time tA.

Figure 6A:
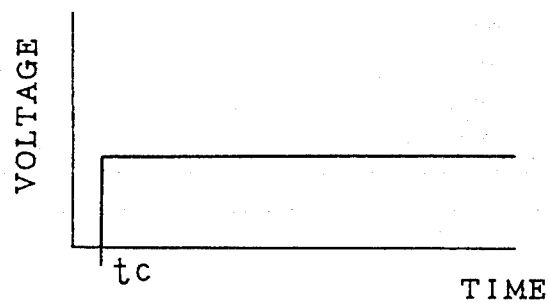
FIGS. 6(a) to (c) are explanatory diagrams showing a comparison between two cases with presence and absence of reset operation for resetting a speed signal to zero.
Figure 6B:
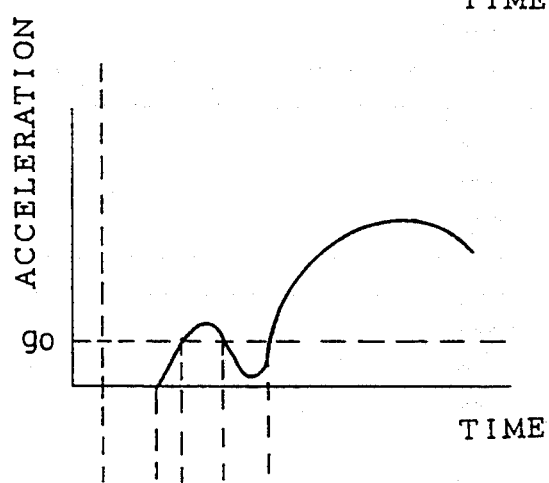
Figure 6C:
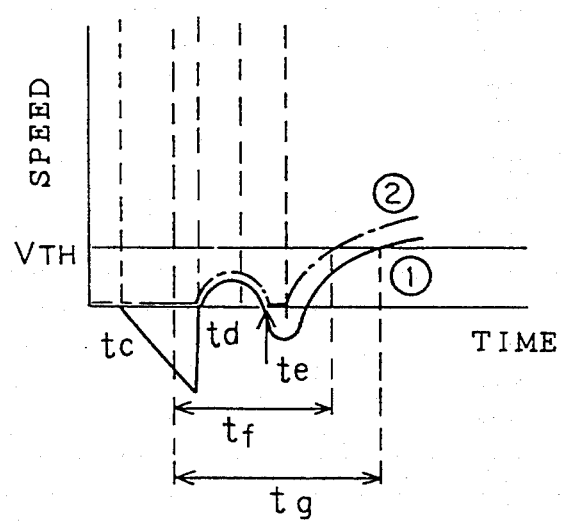

Next, the acceleration signal is integrated as shown in Steps ST40 and ST41 of the flowchart of FIG. 4. With reference to FIG. 6, a description will now be given of a comparison between two cases with presence and absence of a reset operation in which the integrated value of the acceleration signal, i.e., the speed signal F is set to zero if F is less than zero.

In FIG. 6, (a) represents a waveform of power supply voltage showing that the DC power source 29 of FIG. 2 is turned ON at a time point $t_c$, and (b) is a waveform of the acceleration signal at the time of the collision requiring the starting signal. Further, (c) means a waveform obtained by integrating after subtracting the amount of offset g from the waveform (b), wherein (1) represents a speed waveform in case the reset operation for setting F to zero is not performed when F is less than zero, and (2) is a waveform in case the reset operation for setting F to zero is performed when F is less than zero.

First, in case the reset operation for setting F to zero is not performed when F is less than zero, it is necessary to forcedly input a reset signal at a time period $t_d$ in the speed waveform (1), resulting in requirement of trigger means. However, no trigger means is required in the waveform (2) wherein the reset operation for setting F to zero is performed if F is less zero at a time point $t_e$ when the acceleration signal than zero.

Secondly, in Step ST41 of FIG. 4, F is clamped to zero at a time point $t_e$ when the acceleration signal becomes a negative value as shown by the waveform (2). Subsequently, the speed waveform rises from a time point when acceleration exceeds the amount of offset g. Thus, a time period $t_f$ required for the waveform (2) reaching the threshold value $V_{TH}$ from a determination starting time point is less than the time period $t_g$ in the case of the waveform (1). As a result, it is possible to obtain the starting signal for a reduced determining time period.

Embodiment 2

Figure 7:
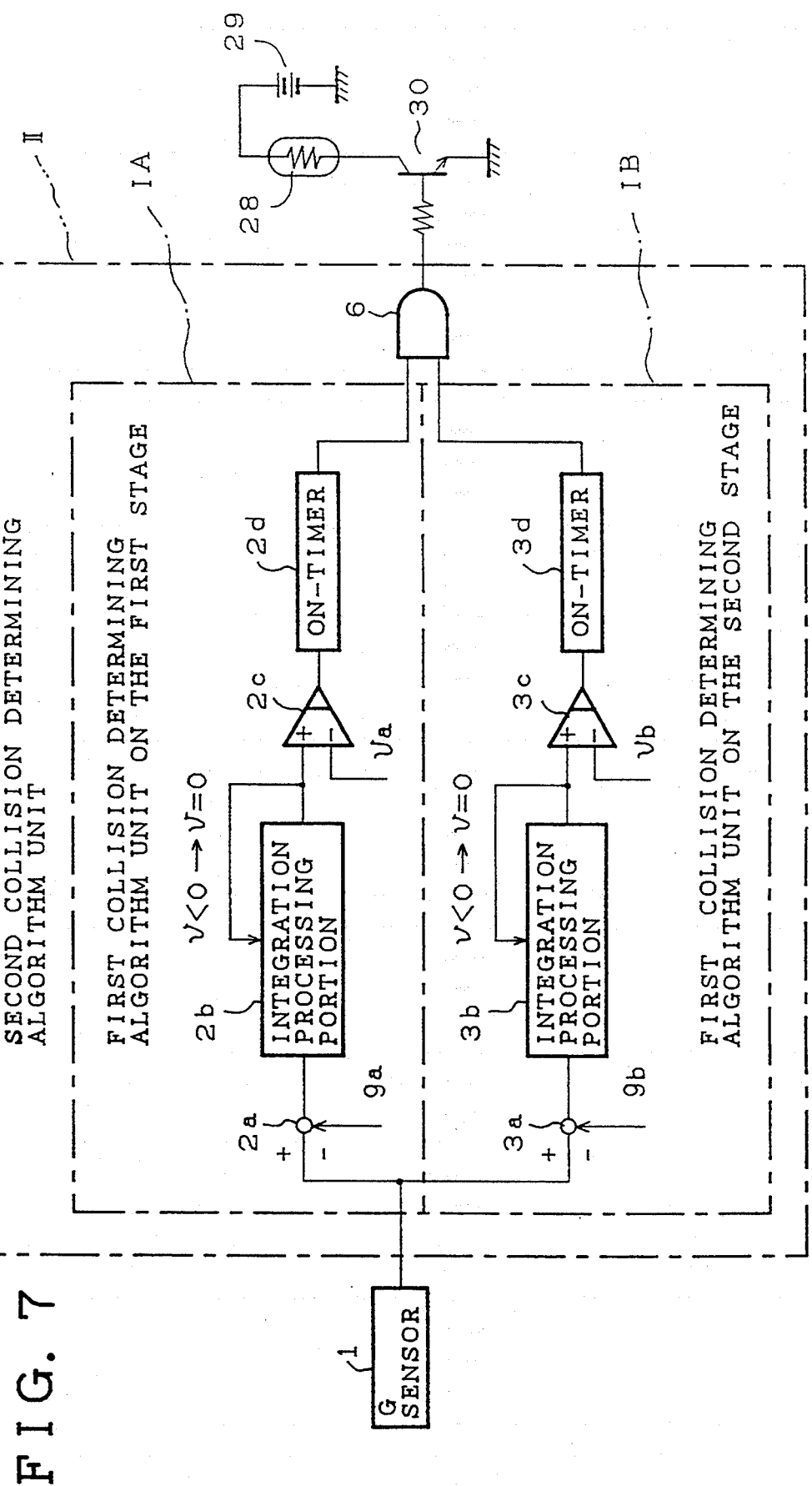
FIG. 7 is a block diagram showing one embodiment of the starting apparatus of the passenger protecting apparatus according to the second aspect of the present invention.

FIG. 7 is a block diagram showing one embodiment according to the second aspect of the present invention. In FIG. 7, reference numeral II means a second collision determining algorithm unit. The second collision determining algorithm unit II includes a first collision determining algorithm unit IA on the first stage, a first collision determining algorithm unit IB on the second stage, and an AND circuit 6. The first collision determining algorithm unit IA on the first stage has the same configuration as that of the first collision determining algorithm unit I shown in FIG. 2. The first collision determining algorithm unit IB on the second stage includes a subtraction processing portion 3a for subtracting a constant value $g_b$ from an output from a G sensor 1, an integration processing portion 3b for initializing an integrated value F to zero if the integrated value F of an output from the subtraction processing portion 3a is less than zero, a comparison processing portion 3c for comparing the integrated value F with preset voltage $v_b$, and an on-timer 3d receiving an output from the comparison processing portion 3c so as to hold an ON state for a predetermined period. The AND circuit 6 obtains the AND of outputs from the first collision determining algorithm units on the first stage and the second stage IA, IB. In FIG. 7, other components are identical with those of FIG. 2 so that the same components are designated by the same reference numerals, and the descriptions thereof are omitted.

In the first collision determining algorithm unit on the first stage IA, a threshold value $v_a$ of the subtraction processing portion 2a is set to output the starting signal by even the low speed collision so as to avoid bombing by mistake. In the first collision determining algorithm unit on the second stage IB, the constant value $g_b$ of the subtraction processing portion 3a and the threshold value $v_b$ of the comparison processing portion 3c are set so as to output the starting signal in response to the high speed collision. Further, the AND circuit 6 obtains the AND of the outputs from both the collision determining algorithm units IA, IB. Therefore, the second collision determining algorithm unit II can serve as a high speed collision determining algorithm unit having a malfunction preventing function.

Figure 8:
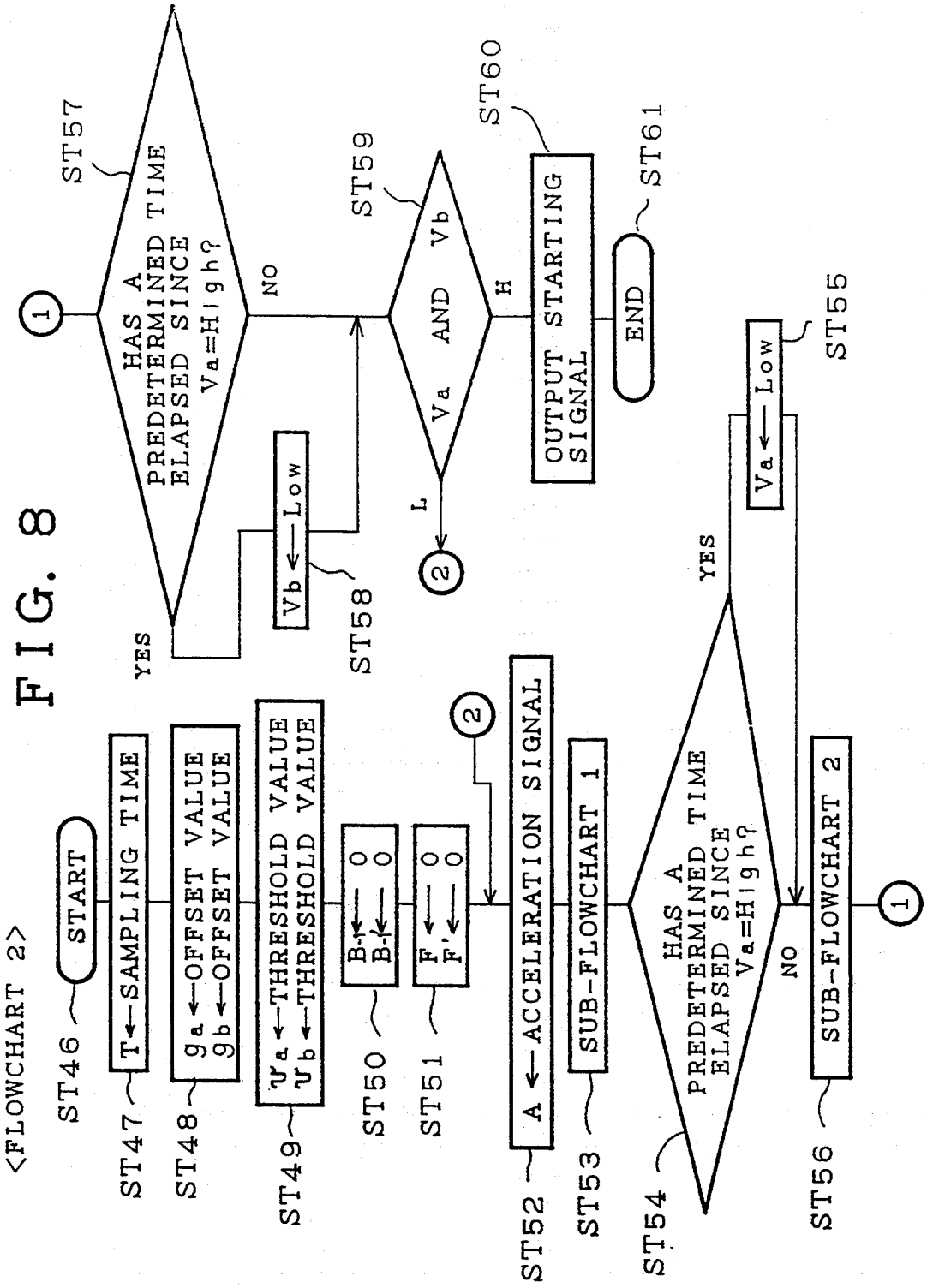
FIG. 8 is a flowchart illustrating the operation of the embodiment of FIG. 7.

A description will now be given of the operation of the embodiment of FIG. 7 with reference to a flowchart of FIG. 8. A sampling time is input in Step ST47, the offset values $g_a$, $g_b$ of the acceleration are input in Step ST48, and the threshold values $v_a$, $v_b$ for use in collision determination are input in Step ST49. In Step ST50, the acceleration preceding by one moment is initialized to zero, and in Step ST51, the integrated value is initialized to zero. In Step ST52, the acceleration signal from the G sensor 1 is input into A, and the operation proceeds to a sub-flowchart 1 shown in FIG. 9 in Step ST53.

Figure 9:
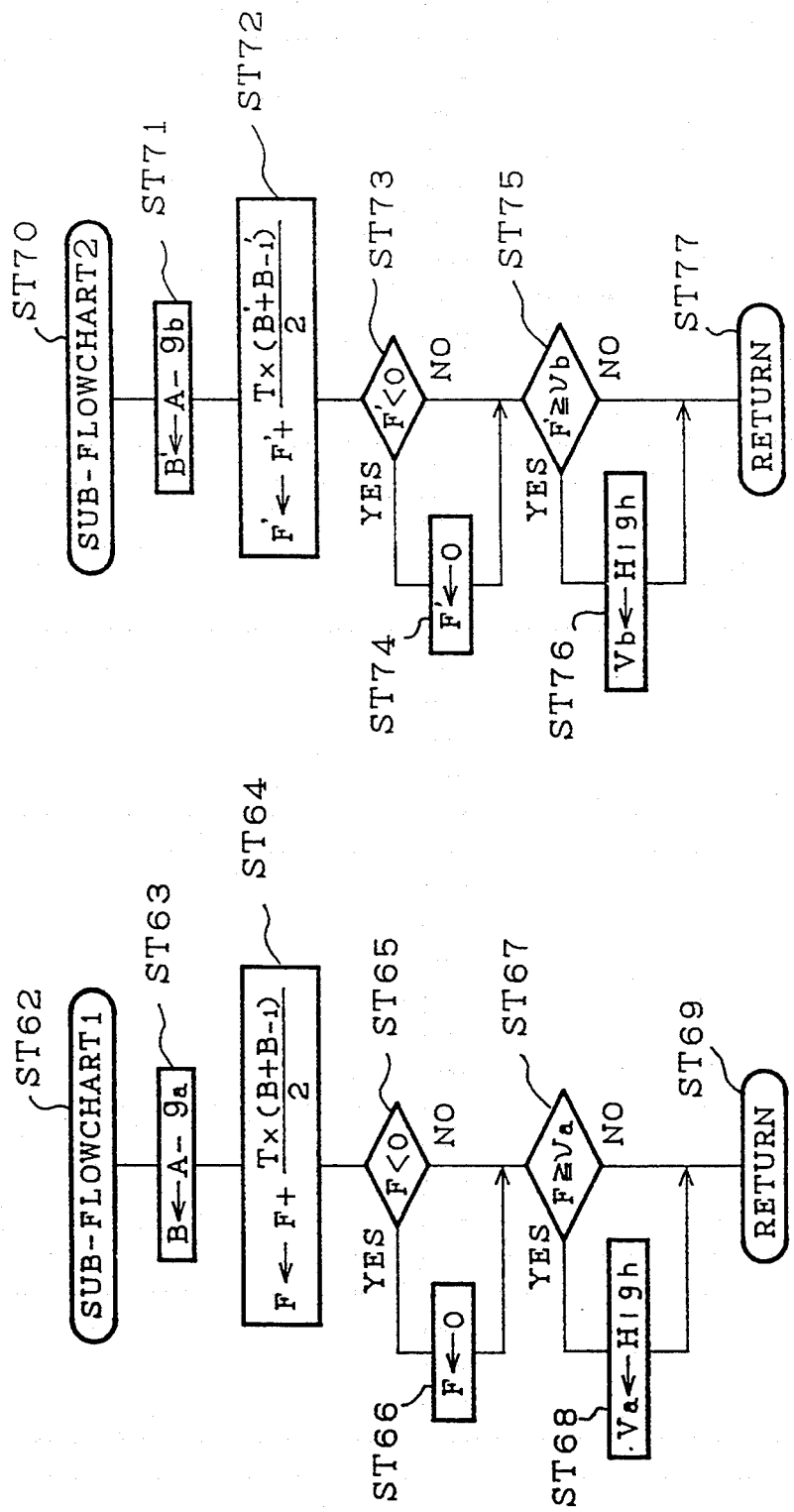
FIG. 9 is sub-flowcharts illustrating the operation of the embodiment of FIG. 7.

Subsequently, the process from Step ST63 to Step ST68 shown in FIG. 9 is performed as in the case of that from Steps ST37 to ST42 of FIG. 5. However, the operation proceeds from Step ST 67 in the direction of NO to Step ST69 so as to return to Step ST54 of FIG. 8. In Step ST54, if it is determined that a predetermined time period has elapsed since a signal of High was obtained in Step ST68, the operation proceeds to Step ST55 where a signal $V_a$ is set to Low. Next, the operation proceeds to sub-flowchart 2 in Step ST56 so as to perform the process from Steps ST70 to ST77 shown in FIG. 10 as in the case of the sub-flowchart 1. Thereafter, the operation returns to Step ST57. In Step ST57, if it is determined that a predetermined time period has elapsed since a signal $V_b$ became High, the operation proceeds to Step ST58 where the signal $V_b$ is set to Low. Further, the operation proceeds to Step ST59 where $V_a$ and $V_b$ are ANDed. If the result is Low, the operation returns to Step ST52 so as to repeat the above-mentioned process. Otherwise, if the result is High, the starting signal is output in Step ST60, and the process is terminated in Step ST61.

Embodiment 3

Figure 10:
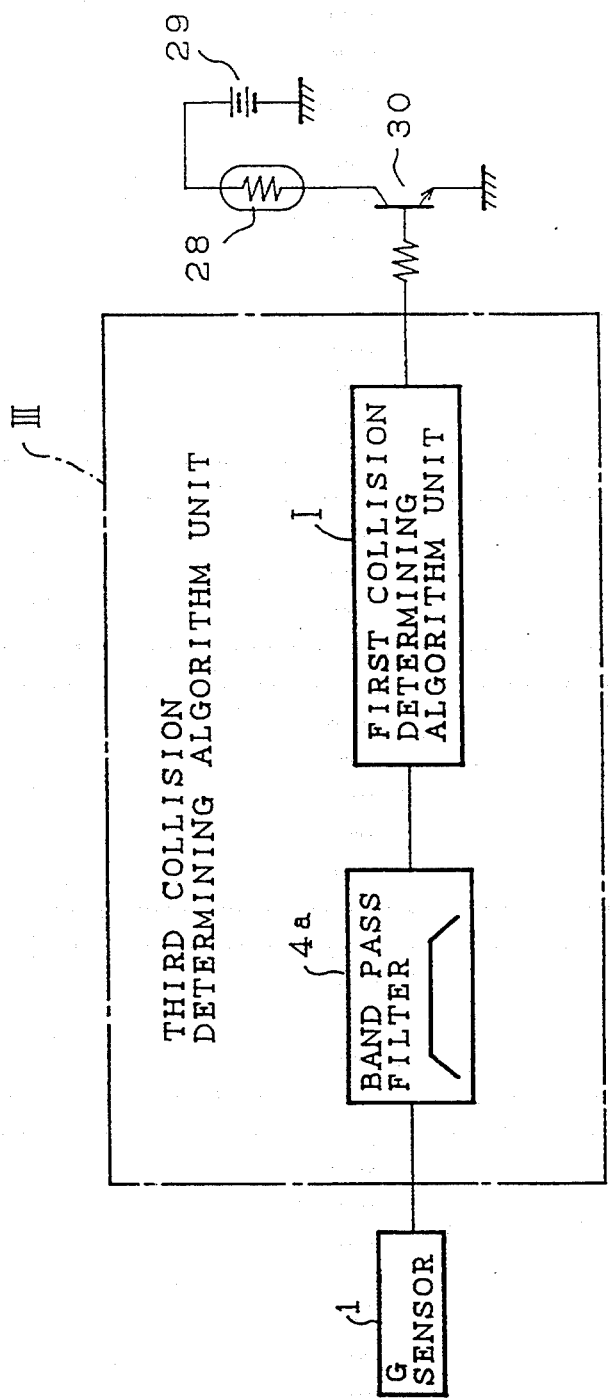
FIG. 10 is a block diagram showing one embodiment of the starting apparatus of the passenger protecting apparatus according to the third aspect of the present invention.

FIG. 10 is a block diagram showing one embodiment according to the third aspect of the present invention.

In FIG. 10, reference numeral III means a third collision determining algorithm unit. The third collision determining algorithm unit III includes a band pass filter 4a at an input terminal of the first collision determining algorithm unit I, and is processed by a microcomputer.

A description will now be given of the process with reference to a flowchart shown in FIG. 11. The process from Steps ST79 to ST91 in FIG. 11 is performed as in the case of that from Steps ST32 to ST43 of FIG. 4 except that the acceleration signal passes through the band pass filter 4a so as to limit band in Step ST83. The process is terminated in Step ST92.

Figure 12A:
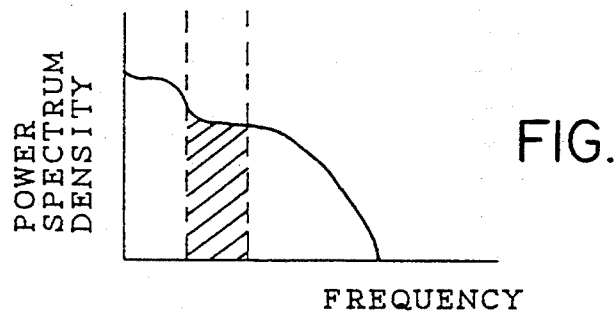
FIGS. 12(a)–(c) are frequency spectrum diagrams of a band pass filter.
Figure 12B:
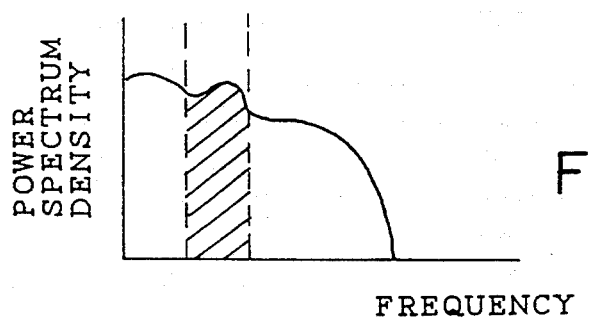
Figure 12C:
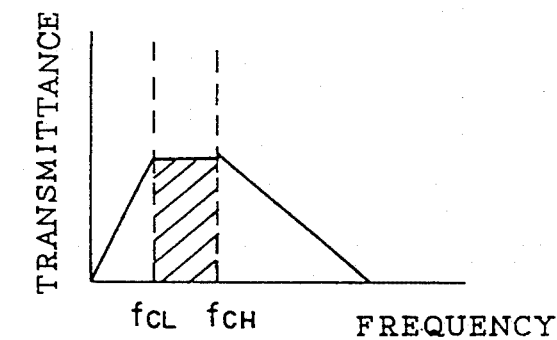
Figure 13A:
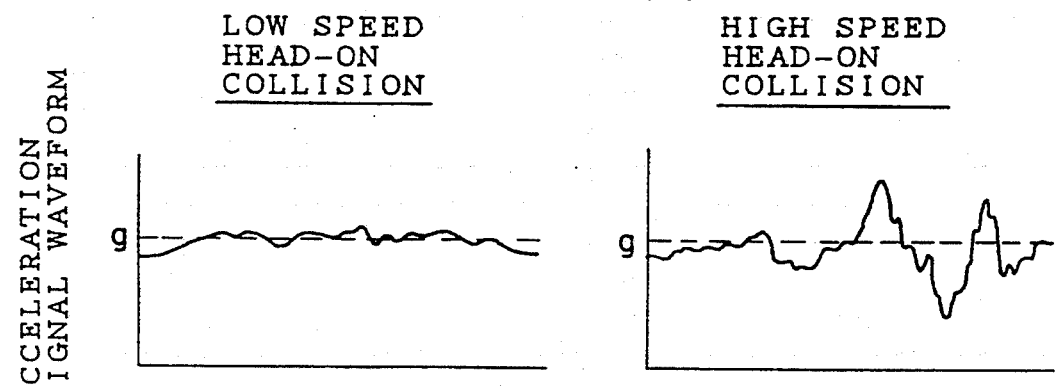
FIGS. 13(A) to (D) are signal waveform diagrams at the time of two different collisions.
Figure 13B:
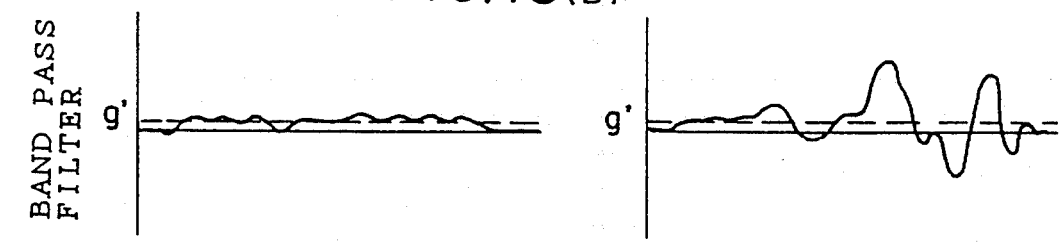
Figure 13C:
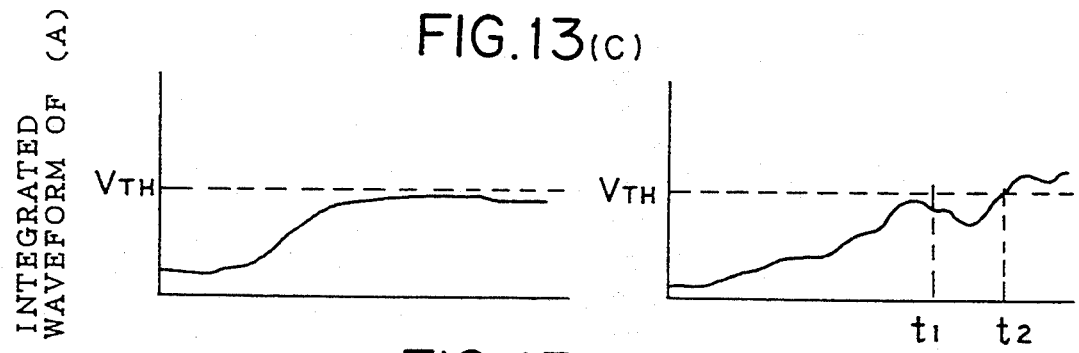
Figure 13D:
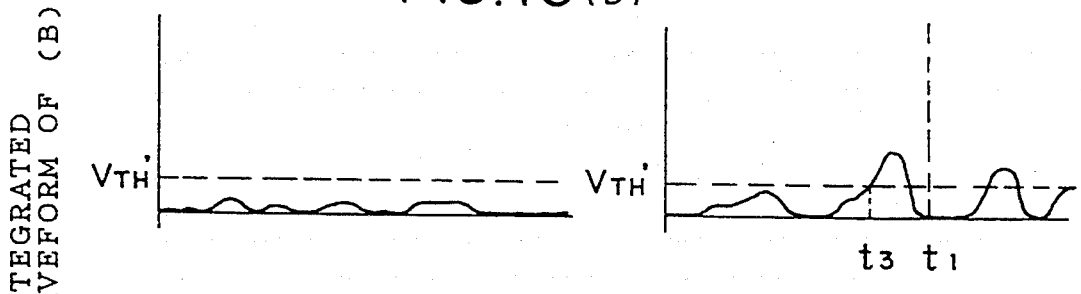

In Step ST83, characteristic of the band pass filter 4a is determined as follows: In FIG. 12, (a) shows a frequency spectrum of the collision signal at the time of typical intermediate and high speed travelling, (b) shows frequency spectrum of the collision signal in the special collision (such as slipping under a rear deck of a truck), and (c) shows a filter characteristic in case the band pass filter 4a is provided by defining cut off frequencies $f_{CL}$, $f_{CH}$ in a frequency band depending upon (a) and (b), in which a characteristic of the special collision is obvious.

A description will now be given of an actual effect of the filter in the acceleration waveform.

In FIG. 13, (A) shows an acceleration signal waveform in a low speed head-on collision which requires no starting signal, and an acceleration signal waveform at the time of a high speed special collision which requires the starting signal. In FIG. 13, (B) shows a waveform after passing an original signal through the band pass filter 4a, (C) shows a waveform obtained by integrating after subtracting a constant value g from the original signal, and (D) shows a waveform when subtracting a predetermined acceleration from the waveform (B) and thereafter integrating after passing through the band pass filter.

As shown in FIG. 13, the constant value g is subtracted from the acceleration signal generated in the low speed head-on collision which requires no starting signal, and the subtracted acceleration signal is integrated so as to define a threshold value $V_{TH}$ which is greater than the integrated value. A desired sensing time point required for protecting a passenger is defined as $t_1$, and the waveform obtained by integrating after subtracting the constant value g from the acceleration signal at the time of the high speed special collision can reach the threshold value $V_{TH}$ at a time point $t_2$. However, the time point $t_2$ exceeds the desired sensing time point $t_1$ so that sufficient protection to the passenger can not be provided by the starting signal at the time point $t_2$.

A predetermined value g' is subtracted from the original signal, and is integrated after passing the original signal through the band pass filter 4a, resulting in a waveform of low speed head-on collision shown in FIG. 13 (D). Accordingly, a threshold value can be set less than the threshold value $V_{TH}$ can be set by defining threshold value $V_{TH}'$ depending upon the resulting waveform. A time point $t_3$ serves as a time point when the waveform at the time of the high speed special collision reaches the threshold value $V_{TH}'$, and the time point $t_3$ is less than the desired sensing time point $t_1$. As a result, it is possible to sufficiently protect the passenger by using the starting signal at the time point $t_3$.

However, there are some drawbacks in the acceleration signal at the time of the high speed rough road travelling at which the starting signal should not be output. That is, in the acceleration signal, there are many frequency components identical with those at the time of high speed special collision, and a larger signal remains even after passing through the band pass filter. Further, the integrated value of the acceleration signal may reach the threshold value $V_{TH}'$ as in the case of the high speed special collision.

Hence, a description will be later given of a discrimination method the high speed rough road travelling by using a large negative acceleration signal which is also generated at the time of the high speed rough road travelling with reference to FIG. 13. However, preceding to the description, another description will now be given of a starting apparatus employing a fourth collision determining algorithm unit IV contained in the algorithm with reference to FIG. 14.

Embodiment 4

Figure 14:
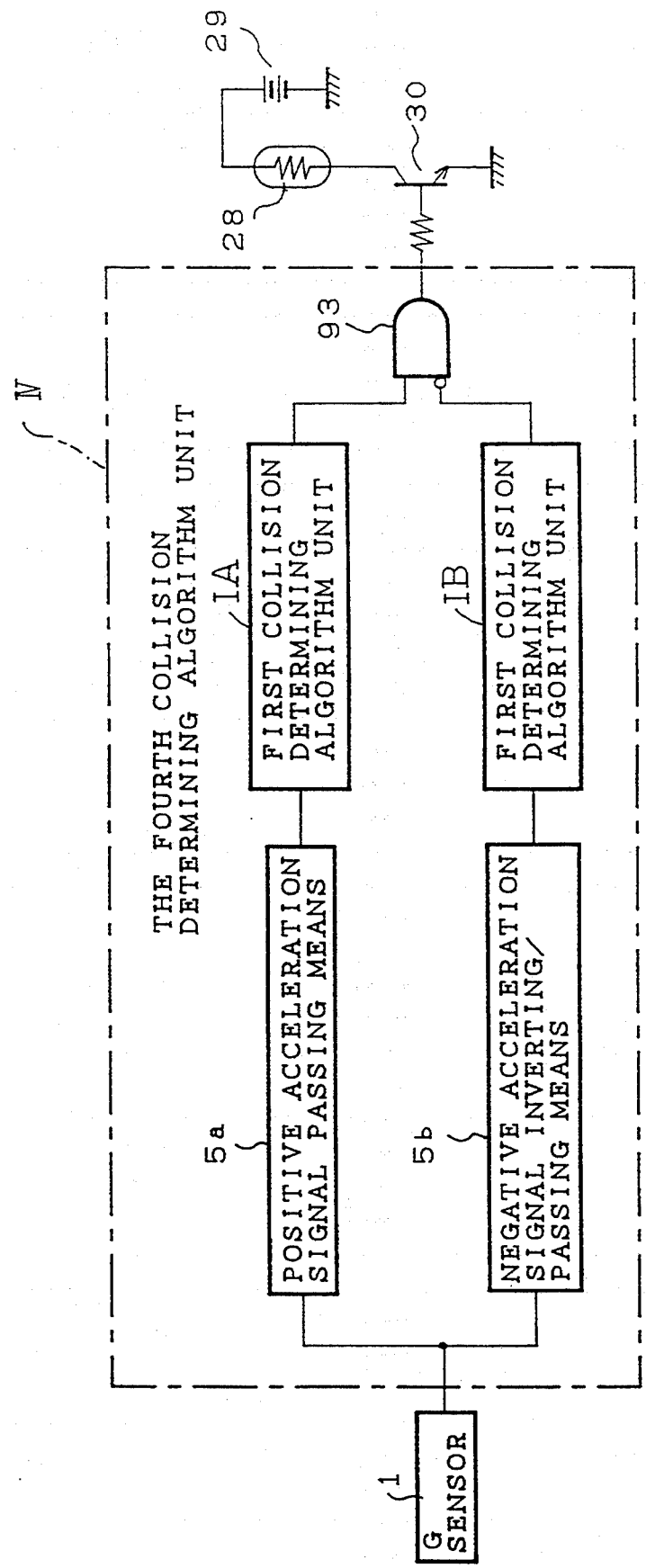
FIG. 14 is a block diagram showing one embodiment of the starting apparatus of the passenger protecting apparatus according to the fourth aspect of the present invention.

FIG. 14 is a block diagram showing one embodiment according to the fourth aspect of the present invention. In FIG. 14, a fourth collision determining algorithm unit IV includes a positive acceleration signal passing means 5a, and a negative acceleration signal inverting-/passing means 5b at the input terminals of the first collision determining algorithm units on the first stage IA and the second stage IB. Further, the fourth collision determining algorithm unit IV includes an AND circuit 93 which obtains the AND of outputs from both the first collision determining algorithm units IA, IB.

The starting apparatus of the embodiment processes the acceleration signals fed from the G sensor 1 on the positive side and on the negative side, separately. That is, the acceleration signal on the positive side is output from the positive acceleration signal passing means 5a, and is determined by the first collision determining algorithm unit IA so as to output the starting signal. Similarly, the acceleration signal on the negative side is inverted and output by the negative acceleration signal inverting/passing means 5b, and is determined by the first collision determining algorithm unit IB so as to output the starting signal. Finally, in the AND circuit 93, both the outputs to actuate starting means 28 are ANDed.

A description will now be given of the operation of the fourth collision determining algorithm unit IV with reference to a flowchart shown in FIG. 15. First, in Step ST95, a sampling time T is input, and a low speed offset acceleration $g_d$ and an intermediate and high speed offset acceleration $g_e$ are input. In Step ST96, output of the starting signal is stopped. The value $B_{-1}$ of acceleration preceding by one moment and the integrated value F are respectively set to zero in Step ST97, and a value $B_{-1}'$ of acceleration preceding by one moment and the integrated value F' are respectively set to zero in Step ST98. In Step ST99, the acceleration signal is fetched into A.

In case a value A is greater than zero in Step ST100, the operation proceeds to Step ST101 to subtract the offset value from A, and proceeds to Step ST102 where trapezoidal integration is performed. In Step ST103, a current value of B is set to the value $B_{-1}$ of acceleration preceding by one moment. In Step ST104, if the integrated value F is less than zero, the operation proceeds to Step ST105 where the integrated value F is clamped to zero, and proceeds to Step ST106. In Step ST104, if the integrated value F is greater than zero, the operation proceeds to Step ST106 so as to compare the integrated value F with the threshold value $V_{TH}$. In Step ST106, the integrated value F is greater than the threshold value $V_{TH}$, the operation proceeds to Step ST107 Where the starting signal is output.

In Step ST106, if the integrated value F is less than the threshold value $V_{TH}$, the operation proceeds to Step ST99 so as to repeat the process set forth above. In Step ST100, if the value A is less than zero, the process from Steps ST109 to ST114 is performed as in the case of that from Steps ST101 to ST106. In Step ST114, if the integrated value F' is greater than the threshold value $V_{TH}'$, the operation proceeds to Step ST115 where the integrated value F is reset to zero.

Embodiment 5

Figure 16:
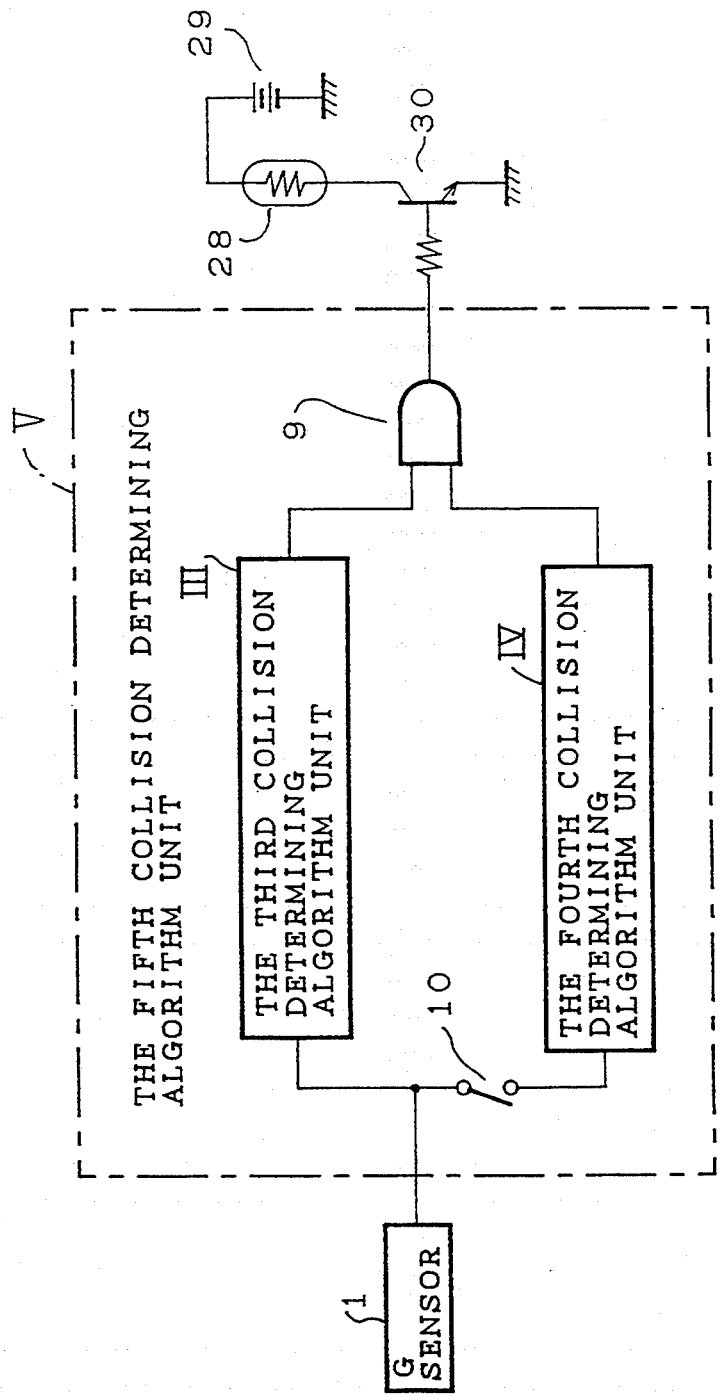
FIG. 16 is a block diagram showing one embodiment of the starting apparatus of the passenger protecting apparatus according to the fifth aspect of the present invention

FIG. 16 is a block diagram showing one embodiment according to the fifth aspect of the present invention. In FIG. 16, reference numeral V means a fifth collision determining algorithm unit. The fifth collision determining algorithm unit V includes the third collision determining algorithm unit III shown in FIG. 10, the fourth collision determining algorithm unit IV shown in FIG. 14, an AND circuit 9 obtaining the AND of outputs from both the collision determining algorithm units III and IV, and switching means 10 for opening and closing an input route of the fourth collision determining algorithm unit IV.

A description will now be given of the operation of the fifth collision determining algorithm unit V with reference to a flowchart of FIG. 17. First, output of the starting signal is stopped in Step 117, and the flowchart 3 of FIG. 1 is performed in Step ST118 and the flowchart 4 of FIG. 15 is performed in Step ST119. In Step ST120, outputs in Steps ST118 and ST119 are ANDed. If the AND is High, the operation proceeds to Step ST121 where the starting signal is output. Otherwise, if the AND is Low, the operation returns to Step ST118 so as to repeat the process set forth above.

However, when the flowchart 3 is performed in Step ST118, the operation jumps from Step ST90 of FIG. 11 to Step ST92 without outputting the starting signal in Step ST91, instead of proceeding from Step ST90 in the direction of NO. Similarly, in the flowchart 4 in Step ST119, the operation jumps from Steps ST106 and ST114 of FIG. 15 to Step ST108 so as to return to Step ST120, instead of proceeding in the direction of N.

FIG. 18 is signal waveform diagrams illustrating the operation of the fifth collision determining algorithm unit V. If an acceleration waveform as shown in FIG. 18 (A) is obtained, the signal passes through the band pass filter 4a in the third collision determining algorithm unit III, resulting in a waveform as shown in FIG. 18 (B). If a predetermined acceleration is subtracted from the signal and the subtracted signal is integrated, a waveform as shown in FIG. 18 (C) can be provided. In this case, the integrated value reaches the threshold value $v_e$ at a time point $t_1$, and a signal is output into an on-timer 4e shown in FIG. 26 if the integrated value exceeds the threshold value $v_e$.

Integrating means 5c, 5g are kept in a reset state until the process set forth above is completed. The switch 10 is closed by using the output signal from the on-timer 4e as a trigger so as to start the algorithm unit IV. Further, reset states of the integrating means 5c and 5e are released, and the acceleration waveform A only on the positive side for a time period from the time points $t_1$ to $t_2$ is fetched. The amount of offset $g_d$ is subtracted from the fetched acceleration waveform A, and thereafter the subtracted acceleration is integrated in the integration processing portion 5c, resulting in a waveform as shown in FIG. 18 (D) on the side of (+). A threshold value $v_d$ of a comparison processing portion 5d is set to a value greater than the integrated value, and an output from the comparison processing portion 5d is left Low.

For a period from the time points $t_2$ to $t_3$, an acceleration of the acceleration waveform (A) on the negative side is inverted and detected. The amount of offset $g_e$ is subtracted from the detected acceleration, and thereafter the subtracted acceleration is integrated in the integration processing portion 5g. If the integrated acceleration exceeds the starting level $v_e$, the comparison processing portion 5h outputs High, and the result of OR process 11 is High. As a result, the comparing means 5d outputs Low since the integrating means 5c is reset.

Finally, in the AND circuit 9, the output from the comparing means 5d is ANDed with the output from the third collision determining algorithm unit III so that the starting signal is not input into an on-timer 4f. As a result, it is possible to avoid a malfunction at the time of the rough road travelling having a large acceleration signal on the negative side.

As set forth hereinbefore, in the AND circuit 9, the output from the third collision determining algorithm unit III is ANDed with the output from the fourth collision determining algorithm unit IV so as to use the AND as a new starting signal.

Embodiment 6

Figure 19:
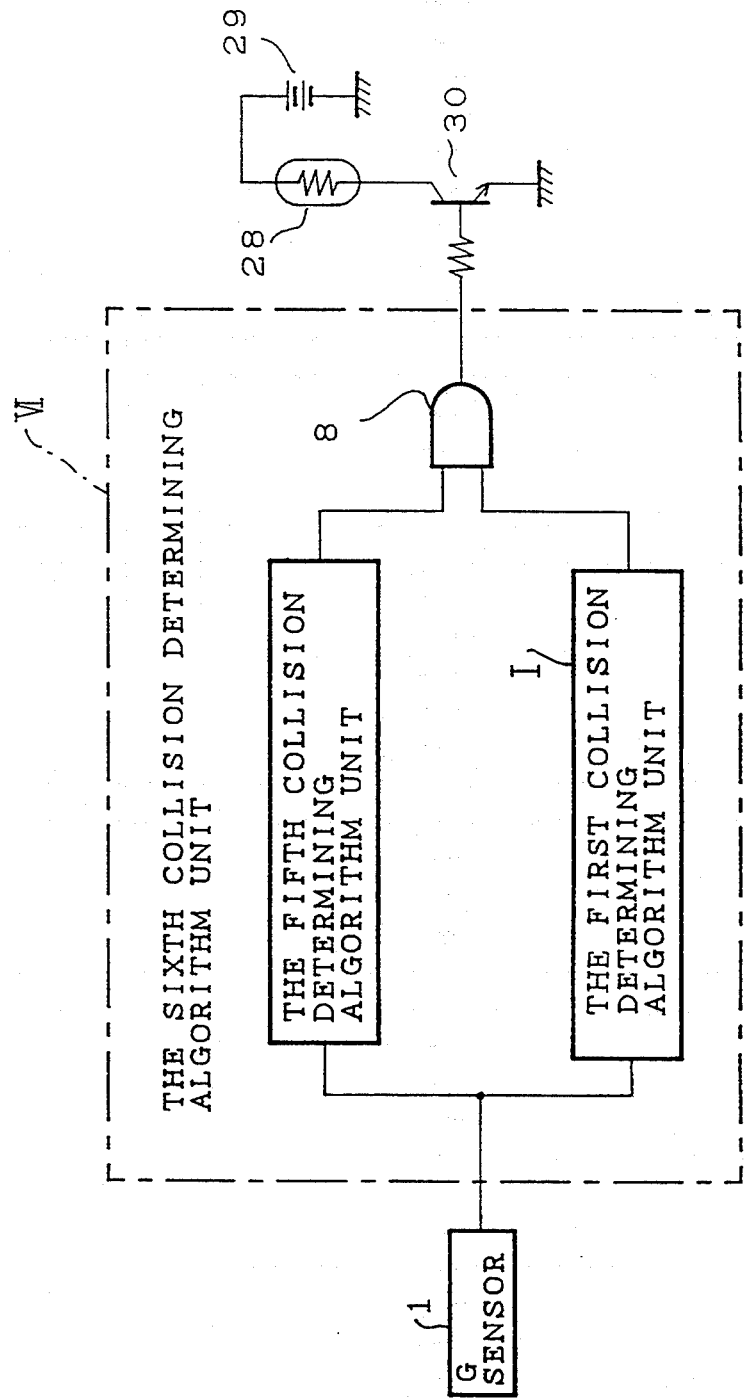
FIG. 19 is a block diagram showing one embodiment of the starting apparatus of the passenger protecting apparatus according to the sixth aspect of the present invention.

FIG. 19 is a block diagram showing one embodiment according to the sixth aspect of the present invention. In FIG. 19, reference numeral VI means a sixth collision determining algorithm unit. The sixth collision determining algorithm unit VI is provided by adding the first collision determining algorithm unit I shown in FIG. 2 to the fifth collision determining algorithm unit V shown in FIG. 16 as mistake bombing avoiding means. Further, the sixth collision determining algorithm unit VI is further provided with an AND circuit 8 obtaining the AND of the outputs from both the collision determining algorithm units V and I, and is processed by the microcomputer shown in FIG. 3.

Figure 20:
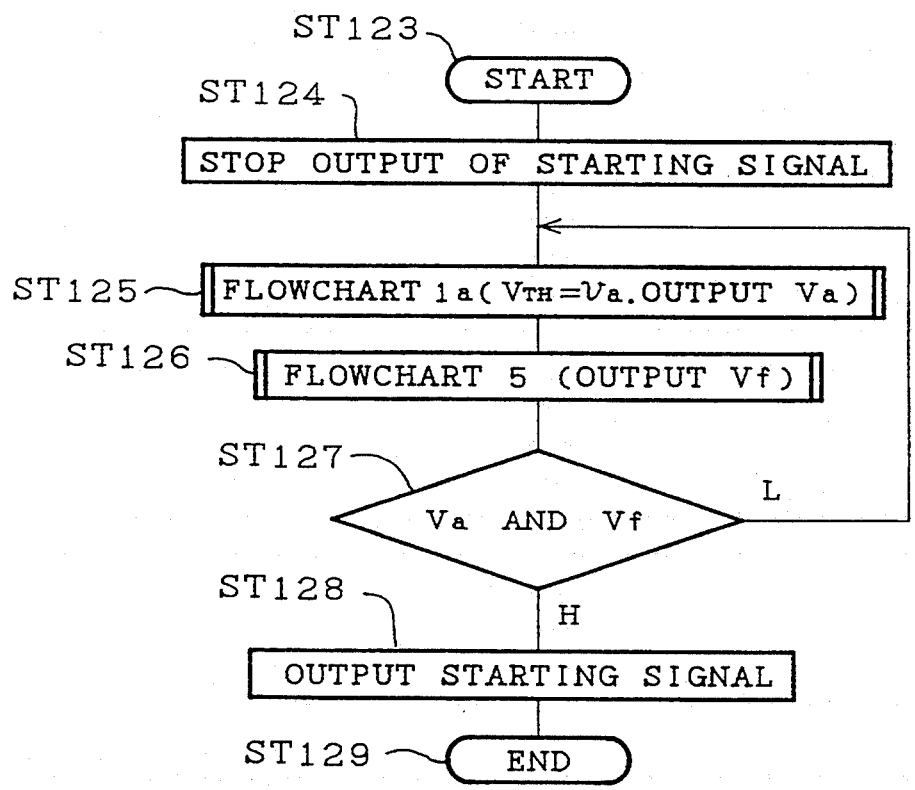
FIG. 20 is a flowchart illustrating the operation of the embodiment of FIG. 19.
Figure 21:
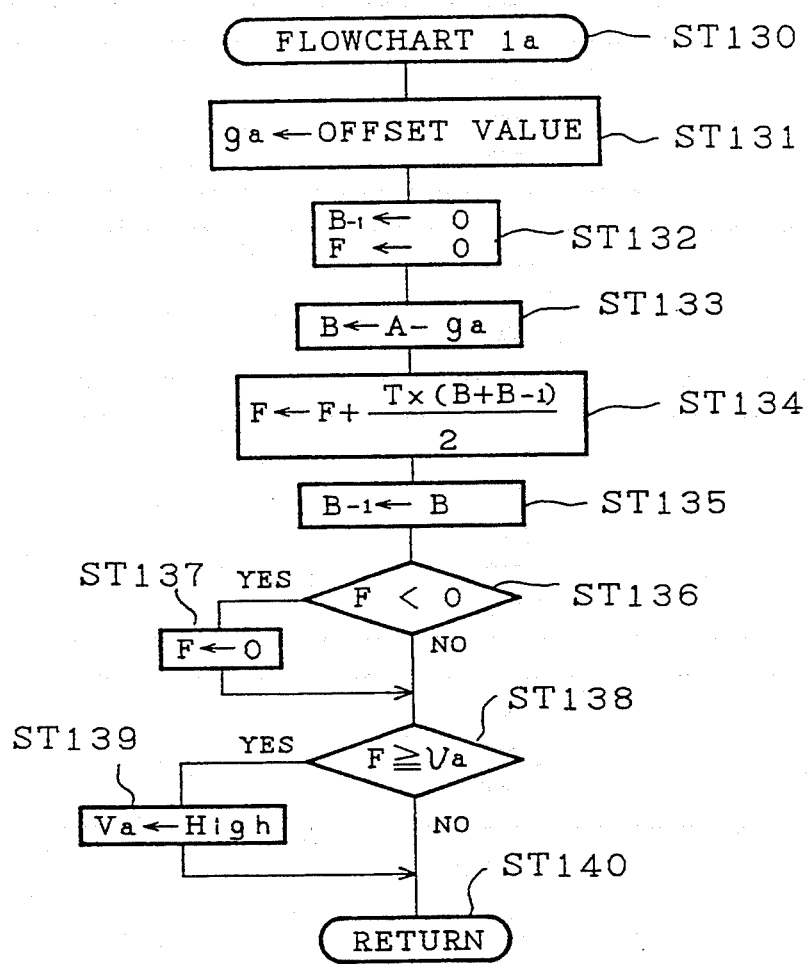
FIG. 21 is a flowchart illustrating the operation of the embodiment of FIG. 19.

A description will now be given of the operation of the sixth collision determining algorithm unit VI with reference to a flowchart of FIG. 20. The output of the starting signal is stopped in Step ST124, and the operation proceeds from Step ST125 to the flowchart 1a shown in FIG. 4. The offset acceleration $g_a$ is input in Step ST131 of FIG. 21, and the value $B_{-1}$ of the acceleration preceding by one moment and the integrated value F are initialized to zero in Step ST132. The offset value $g_a$ is subtracted from A in Step ST133, and the trapezoidal integration is performed in Step ST134. Current acceleration B is input into acceleration preceding by one moment in Step ST135, and the operation proceeds to Step ST138 if the integrated value F is less than zero in Step ST136. In Step ST138, if the integrated value F is greater than the threshold value $v_a$, the operation proceeds to Step ST139 where the threshold value $v_a$ is set to High. Otherwise, the operation proceeds to Step ST140 so as to return to the flowchart 5 in Step ST126.

Subsequently, the flowchart 5 is performed in Step ST126, and the operation proceeds to Step ST127 where outputs $v_a$ and $V_f$ from the Steps ST125 and ST126 are ANDed. If the AND is High, the starting signal is output in Step ST128. If the AND is Low, the operation returns to Step ST125 so as to repeat the process set forth FIG. 17) in Step ST126, if the AND is Low when $V_c$ and $V_d$ above.

Figure 17:
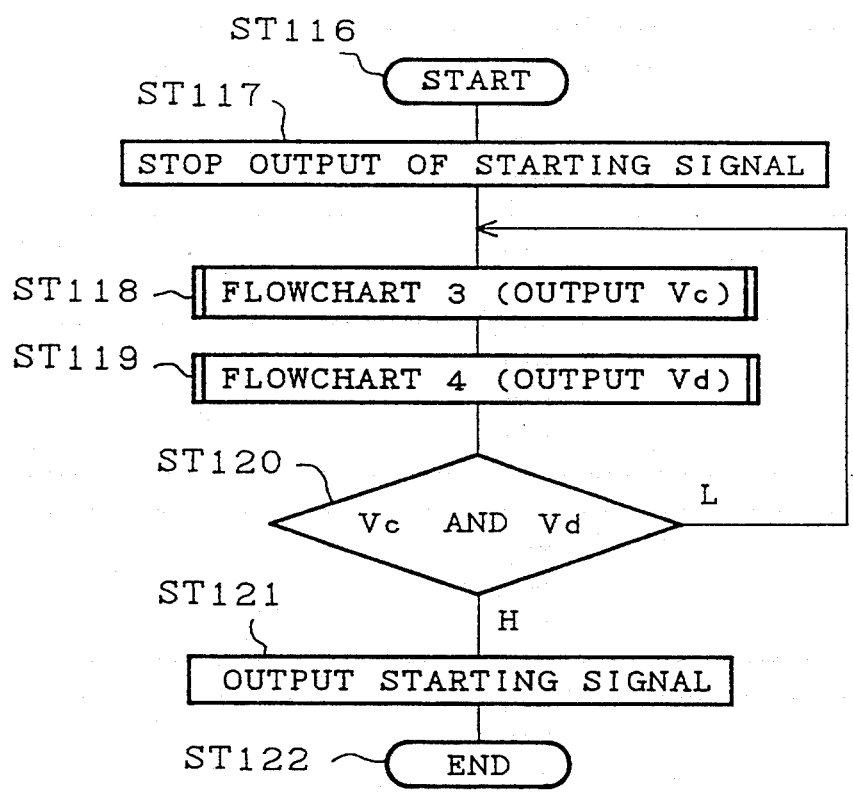
FIG. 17 is a flowchart illustrating the operation of the embodiment of FIG. 16.
Figure 18A:
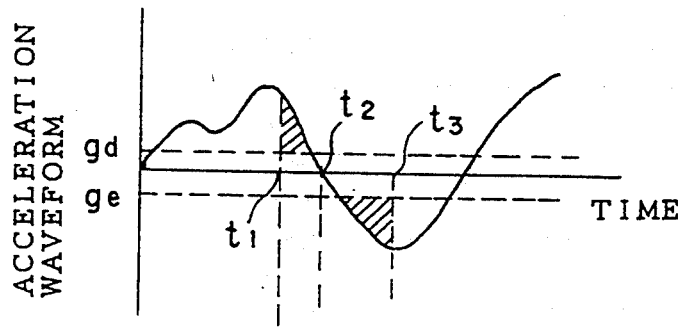
FIGS. 18(A)–(D) are signal waveform diagrams illustrating the operation of the embodiment of FIG. 16.
Figure 18B:
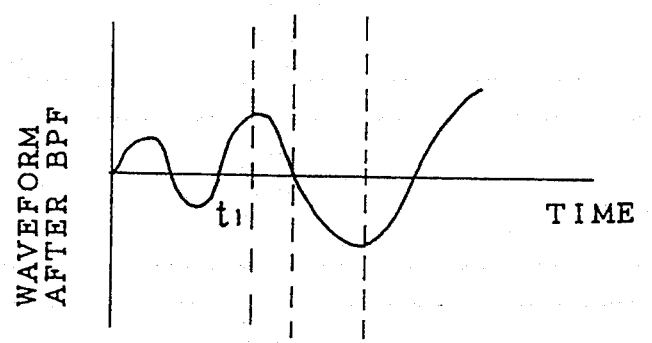
Figure 18C:
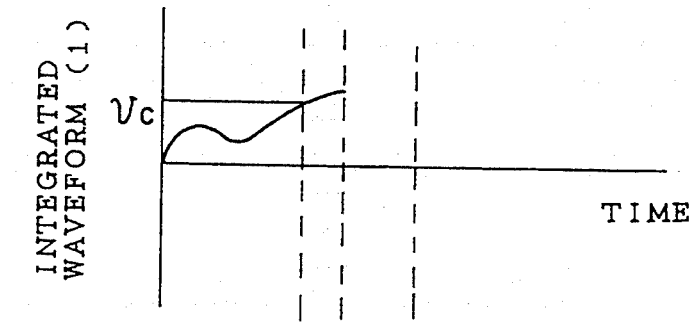
Figure 18D:
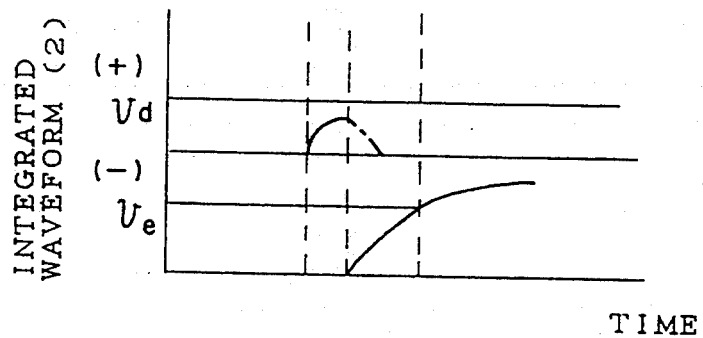

However, in the operation of the flowchart 5 (see FIG. 17) in Step ST126, if the AND is Low when $V_c$ and $V_d$ are ANDed in Step ST120 of FIG. 17, the operation jumps to Step ST122 instead of outputting the starting signal in Step ST121. The sixth collision determining algorithm unit VI can discriminate between the rough road travelling and the special collision, and includes additional means for preventing from bombing by mistake. As a result, it is possible to perform a highly reliable determination.

Embodiment 7

Figure 22:
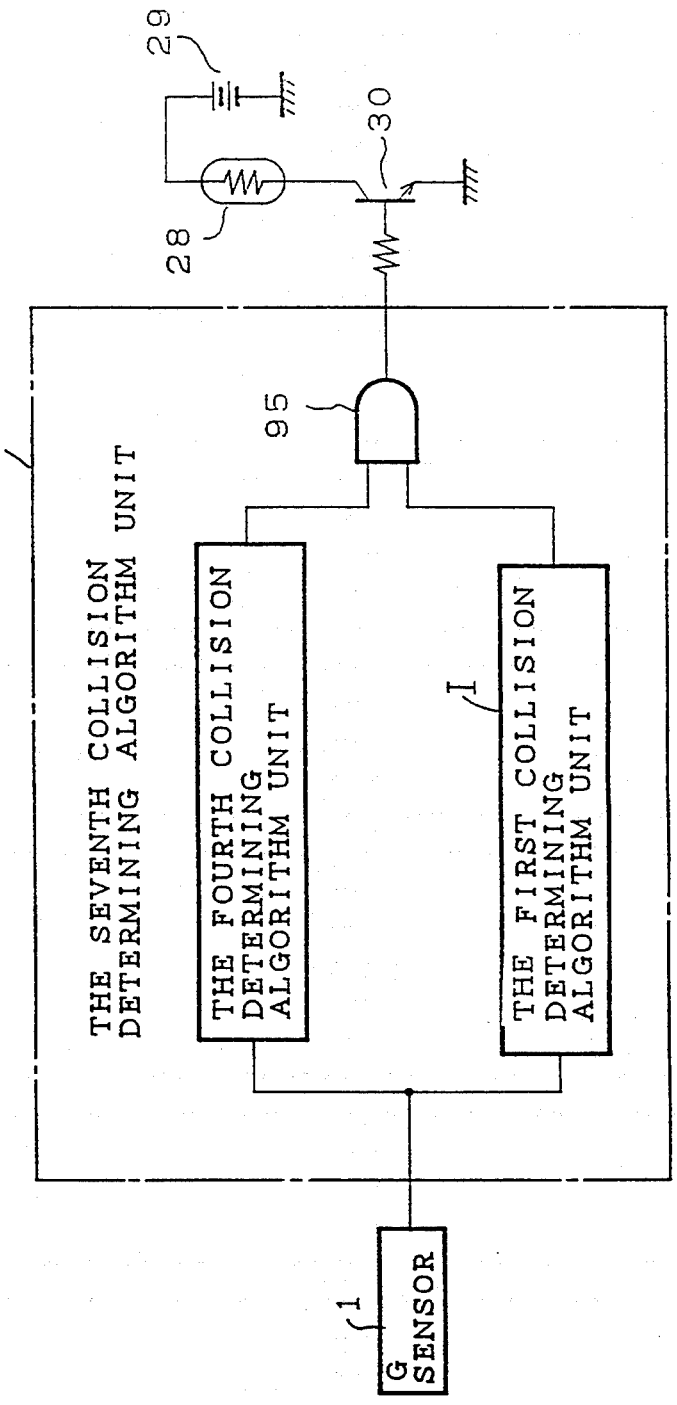
FIG. 22 is a block diagram illustrating one embodiment of the starting apparatus of the passenger protecting apparatus according to the seventh aspect of the present invention.

FIG. 22 is a block diagram showing one embodiment according to the seventh aspect of the present invention. In FIG. 22, reference numeral VII means a seventh collision determining algorithm unit. The seventh collision determining algorithm unit VII is provided by adding the first collision determining algorithm unit I to the fourth collision determining algorithm unit IV as mistake bombing avoiding means. Further, the seventh collision determining algorithm unit VII is provided with an AND circuit 95 obtaining the AND of the outputs from both the collision determining algorithm units IV and I.

A description will now be given of the operation of the seventh collision determining algorithm unit VII with reference to FIG. 23. The output of the starting signal is stopped in Step ST149. The operation proceeds to Step ST150 to perform the flowchart 1a (see FIG. 4), and to Step ST151 to perform the flowchart 4 (see FIG. 15). In Step ST152, outputs $v_a$ and $V_d$ from Steps ST150 and ST151 are ANDed. If the result is High, the operation proceeds to Step ST153 where the starting signal is output. If the result is Low, the operation returns to Step ST150 so as to repeat the process set forth above.

Figure 15:
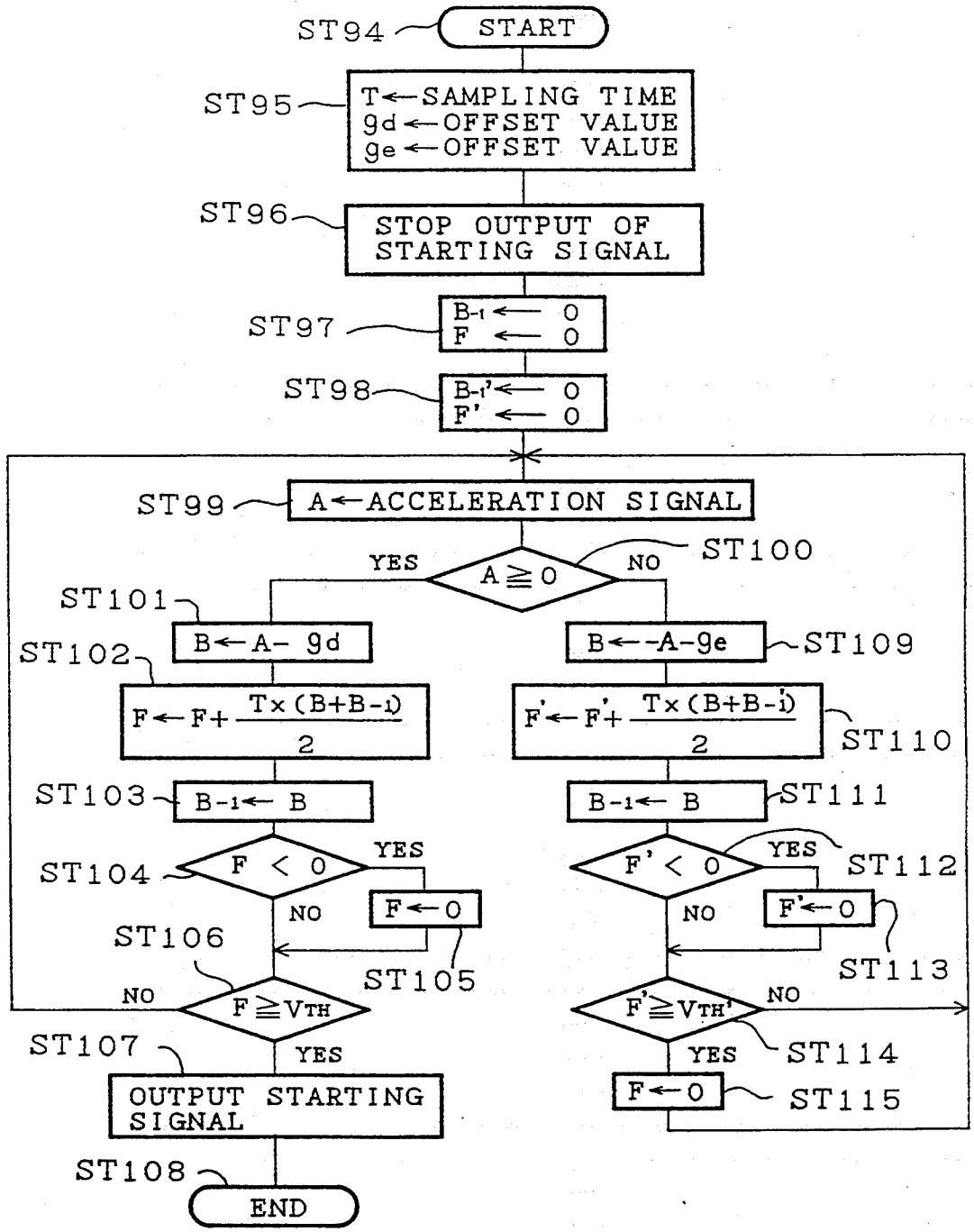
FIG. 15 is a flowchart illustrating the operation of the embodiment of FIG. 14.
Figure 23:
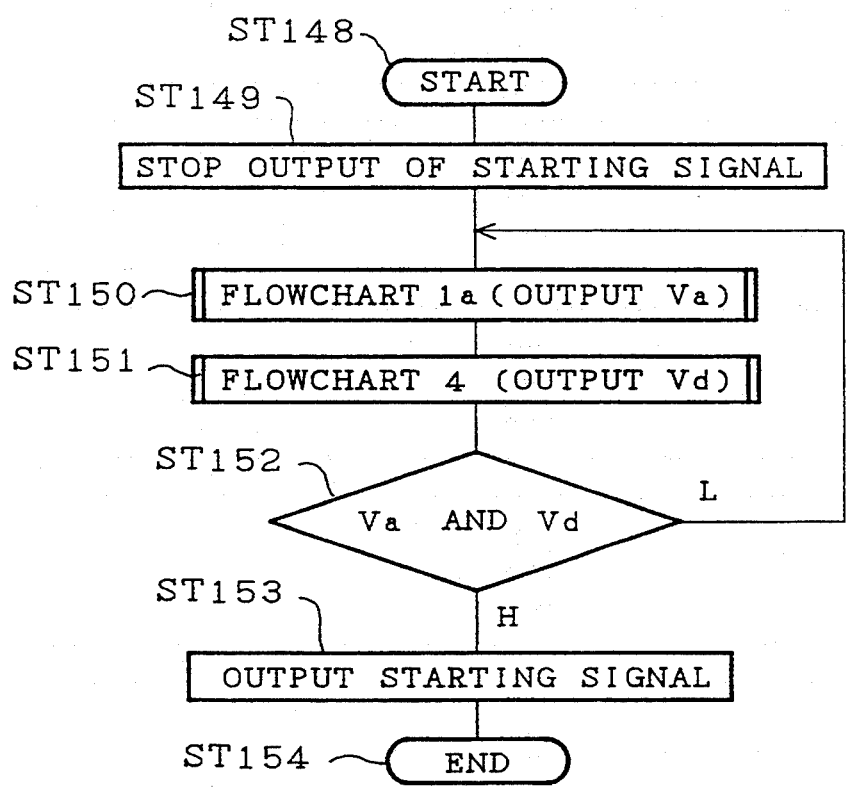
FIG. 23 is a flowchart illustrating the operation of the embodiment of FIG. 22.

However, when the operation proceeds to the flowchart 4 in Step ST151 in the flowchart 7 of FIG. 23, the operation jumps to Step ST108 if F is less than $V_{TH}$ in Step ST106 of FIG. 15. Further, the operation jumps to Step ST108 to end, instead of outputting the starting signal in Step ST107 in case F' is similarly less than $V_{TH}'$ in Step ST114 and when the process in Step ST115 is terminated.

As set forth above, the algorithm for detecting the rough road travelling is provided with the mistake bombing avoiding means. As a result, it is possible to perform a highly reliable determination.

Embodiment 8

Figure 24:
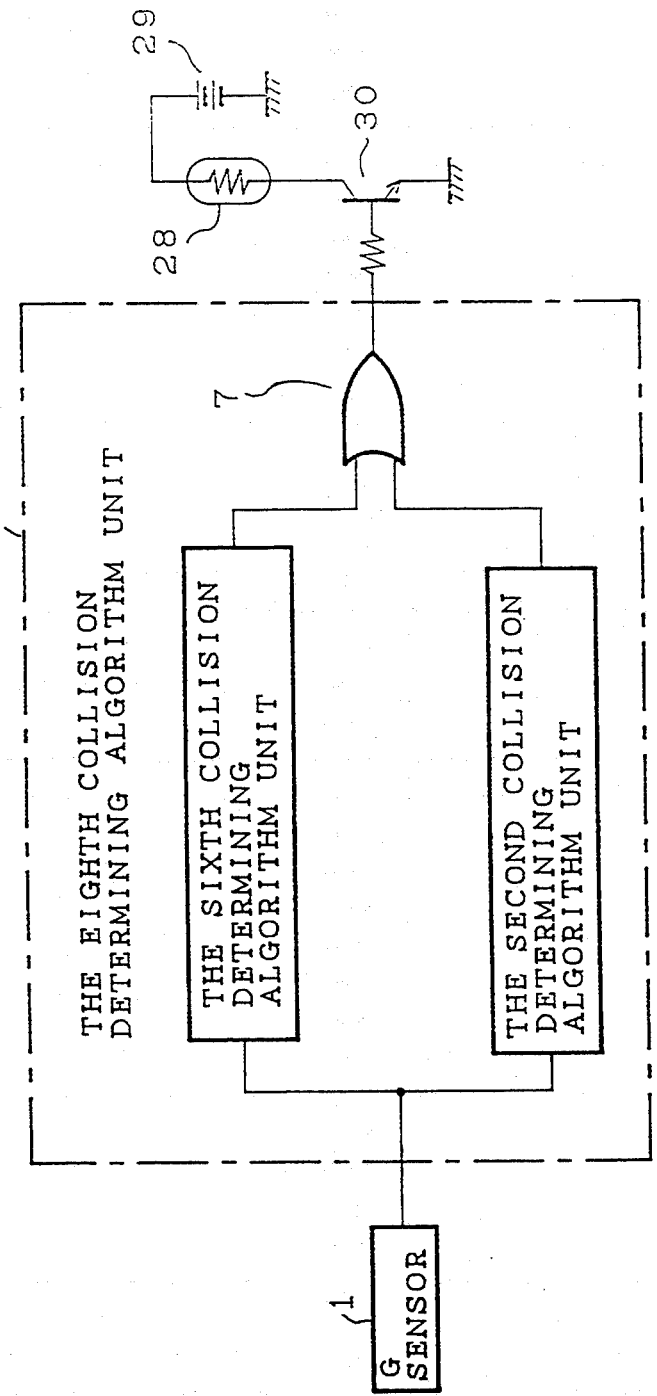
FIG. 24 is a block diagram showing one embodiment of the starting apparatus of the passenger protecting apparatus according to the eighth aspect of the present invention.

FIG. 24 is a block diagram showing one embodiment according to the eighth aspect of the present invention. In FIG. 24, reference numeral VIII means an eighth collision determining algorithm unit. The eighth collision determining algorithm unit VIII includes the second collision determining algorithm unit II and the sixth collision determining algorithm unit VI, and an AND circuit 7 obtaining the AND of the outputs from both the collision determining algorithm units II and VI.

Figure 25:
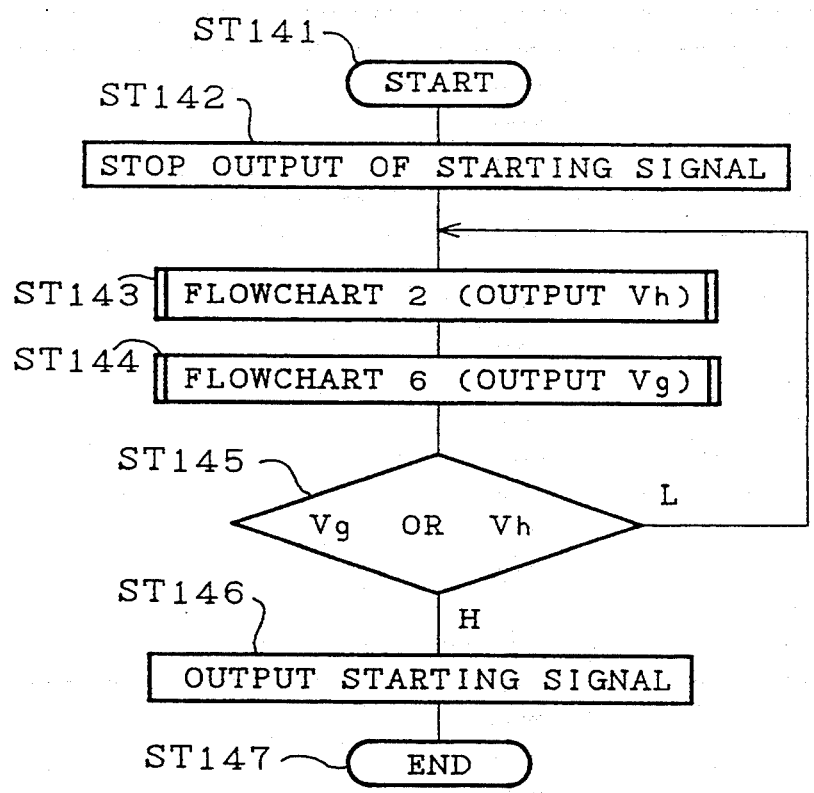
FIG. 25 is a flowchart illustrating the operation of the embodiment of FIG. 24.

A description will now be given of the operation of the eighth collision determining algorithm unit VIII with reference to a flowchart of FIG. 25. First, the output of the starting signal is stopped in Step ST142. The operation proceeds to Step ST143 to perform the flowchart 2 (see FIG. 8), and to Step ST144 to perform the flowchart 6 (see FIG. 20). In Step ST145, outputs $V_h$ and $V_g$ from Steps ST143 and ST144 are ANDed. If the result is High, the operation proceeds to Step ST146 where the starting signal is output. If the result is Low, the operation returns to Step ST143 so as to repeat the process set forth above.

However, when the operation proceeds to the flowchart 2 in Step ST143, the operation jumps to Step ST61 instead of proceeding to Step ST60 where the starting signal is output if the AND of $V_a$ and $V_b$ is Low in Step ST59 of the flowchart 2. Further, when the operation proceeds to the flowchart 6 in Step ST144, the operation jumps to Step ST129, instead of proceeding to Step ST128 where the starting signal is output if the AND of $V_a$ and $V_f$ is Low in Step ST127. In the eighth collision determining algorithm unit. VIII, it is possible to perform a synthetic determination of the high speed collision, the low speed collision, the rough road travelling and the special collision, and thereby output the starting signal.

Figure 26:
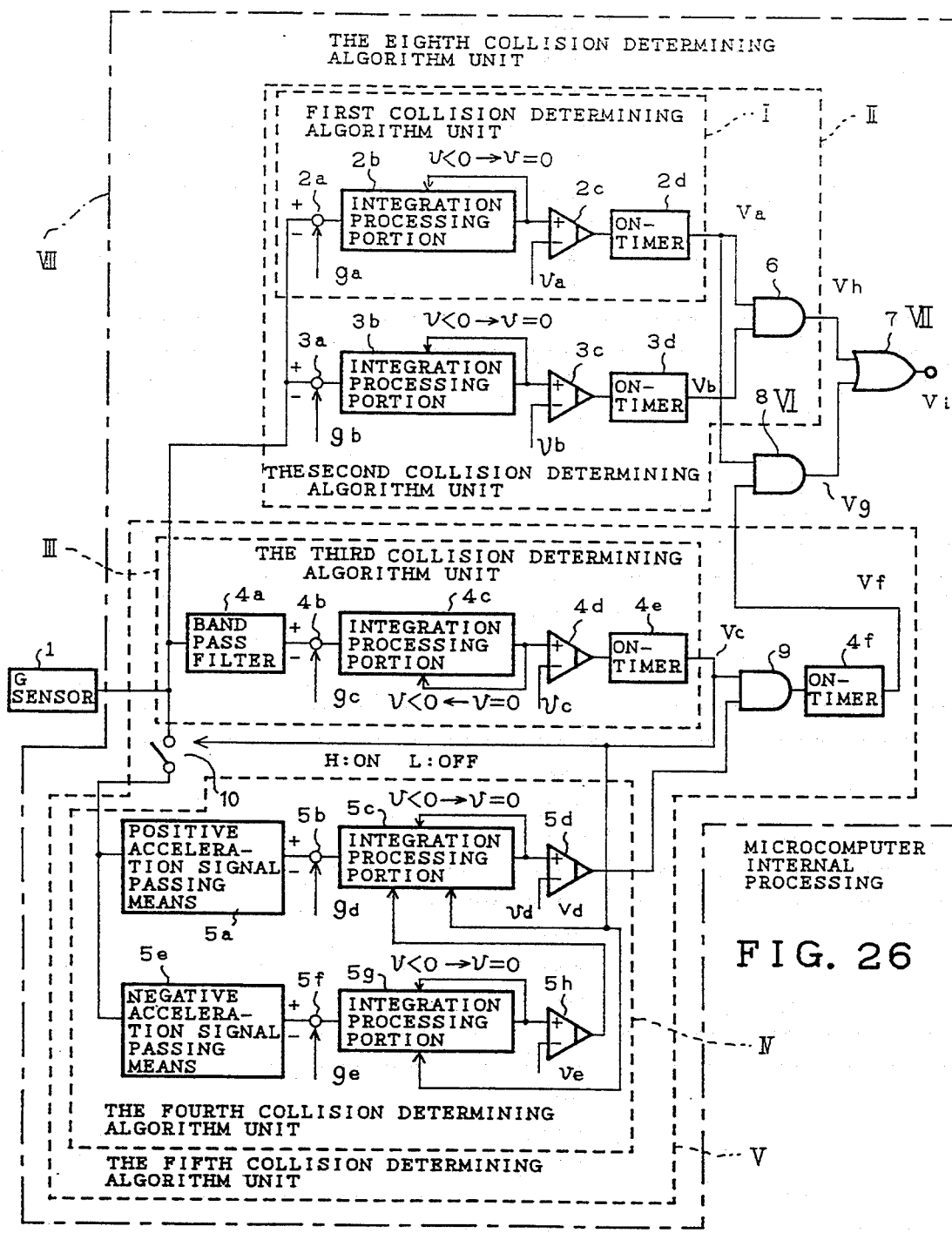
FIG. 26 is a block diagram showing a detailed configuration of a collision determining algorithm unit of FIG. 24.

FIG. 26 is a block diagram showing in detail the eighth collision determining algorithm unit VIII including the first, second, third and fourth collision determining algorithm units I, II, III and IV shown in FIGS. 2, 7, 10, and 14. In FIG. 26, components identical with those in the respective drawings are designated by the same reference numerals, and the descriptions thereof are omitted.

Figure 27:
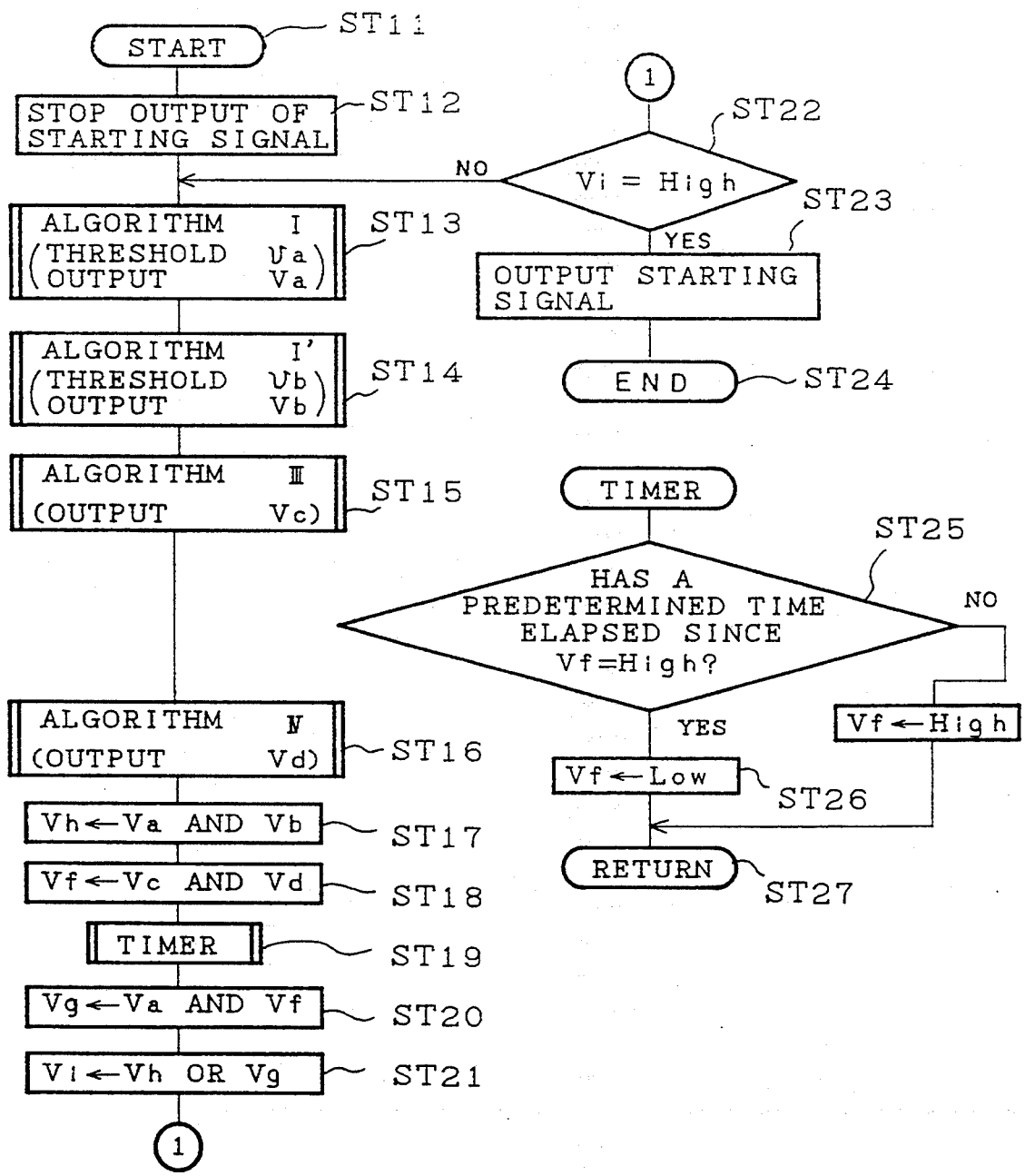
FIG. 27 is a flowchart illustrating the operation of the embodiment of FIG. 26.

FIG. 27 is a flowchart illustrating the operation of the eighth collision determining algorithm unit VIII shown in FIG. 26. Referring now to FIG. 27, the output of the starting signal is stopped in Step ST12, and the operation proceeds to Step ST13 to perform the algorithm I, to Step ST14 to perform the algorithm I', to Step ST15 to perform the algorithm III, and to Step ST16 to perform the algorithm IV. In Step ST17, the output $V_a$ in ST13 and the output $V_b$ in ST14 are ANDed and the result is defined as $V_h$. Further, in Step ST18, the output $V_c$ in ST15 and output $V_d$ in ST16 are ANDed and the result is defined as $V_f$. A High state of $V_r$ is held for a predetermined period in Step ST19, and $V_a$ and $V_f$ are ANDed in Step ST20 and the result is defined as $V_g$. In Step ST21, $V_h$ and $V_g$ are ANDed and the result is defined as $V_i$. In Step ST22, if the value $V_i$ is High, the operation proceeds to Step ST23 so as to output the starting signal, and proceeds to Step ST24 to end. If $V_i$ is Low, the operation returns to Step ST13 so as to repeat the process set forth above.

Though the collision determining units in the embodiments are processed by a software in the microcomputer, the collision determining unit may be partially or completely provided to include only hardware circuits.

As set forth above, according to the first aspect of the present invention, there is provided the first collision determining algorithm unit to perform an integration with the speed signal defined as zero in case the speed signal obtained by integrating after subtracting the constant value from the acceleration signal is less than zero. As a result, there are advantages of reduction of the collision determining time, as well as removal of a trigger circuit for resetting the integration circuit.

According to the second aspect of the present invention, there is provided the second collision determining algorithm unit including the first collision determining algorithm unit on the first stage which outputs in response to even a relatively soft collision, the first collision determining algorithm unit on the second stage which outputs in response to the high speed collision, and the AND circuit which obtains the AND of outputs from both the first collision determining algorithm units. As a result, there is an effect in that further accurate determination can be performed at the time of the high speed collision.

According to the third aspect of the present invention, there is provided the third collision determining algorithm unit employing the band pass filter on the preceding stage of the first collision determining algorithm unit. As a result, there is an effect in that it is possible to extract the characteristics of the acceleration signal waveforms of the low speed head-on collision and the high speed head-on collision so as to discriminate therebetween.

According to the fourth aspect of the present invention, there is provided the fourth collision determining algorithm unit for comparing an output of the integrated acceleration signal on the positive side with an output of the integrated acceleration signal on the negative side in the acceleration signals so as to define a more rapidly output as the starting signal. As a result, there is an effect in that the rough road travelling can be discriminated since an acceleration signal waveform is also formed largely on the negative side at the time of the rough road travelling.

According to the fifth aspect of the present invention, there is provided the fifth collision determining algorithm unit which is a combination of the third collision determining algorithm unit and the fourth collision determining algorithm unit. As a result, there is an effect in that a highly reliable discrimination can be performed between the rough road travelling and the special collision.

According to the sixth aspect of the present invention, there is provided the sixth collision determining algorithm unit which is a combination of the first collision determining algorithm unit and the fifth collision determining algorithm unit. As a result, there are effects in that a safety function can be provided, and a highly reliable discrimination can be performed between the rough road travelling and the special collision.

According to the seventh aspect of the present invention, there is provided the seventh collision determining algorithm unit which is a combination of the first collision determining algorithm unit and the fourth collision determining algorithm unit. As a result, there are effects in that a safety function can be provided, and a highly reliable discrimination of the rough road travelling can be performed.

According to the eighth aspect of the present invention, there is provided the eighth collision determining algorithm unit which is a combination of the second collision determining algorithm unit and the sixth collision determining algorithm unit. As a result, There is an effect in that a highly reliable discrimination can be performed between the high speed collision and the rough road travelling and the special collision among all the collisions.

While preferred embodiments of the invention have been described using specific terms, such description is for illustrative purposes only, and it is to be understood that changes and variations may be made without departing from the spirit or scope of the following claims.

What is claimed is:

1. A starting apparatus of a passenger protecting apparatus comprising:

a fourth collision determining algorithm unit including an acceleration sensor converting an acceleration at a time of collision into an electrical acceleration signal to output said electrical acceleration signal, positive acceleration signal passing means for extracting only an acceleration signal on a positive side in said acceleration signal output from said acceleration sensor, first subtracting means for subtracting a first threshold value from an output from said positive acceleration signal passing means, first integrating means for integrating an output from said first subtracting means, having a reset function for forcedly resetting an integrated value to zero when said integrated value is less than zero, first comparing means for comparing an output from said first integrating means with a second threshold value, negative acceleration signal inverting/passing means for extracting only an acceleration signal on a negative side in said acceleration signal output from said acceleration sensor, second subtracting means for subtracting a third threshold value from an output from said negative acceleration signal inverting/passing means, second integrating means for integrating an output from said second subtracting means, having a reset function for forcedly resetting an integrated value to zero when said integrated value is less than zero, second comparing means for comparing an output from said second integrating means with a fourth threshold value, and an AND circuit prohibiting an output from said first comparing means by an output from said second comparing means; and starting means for outputting a starting signal depending upon an output from said fourth collision determining algorithm unit.

2. A starting apparatus of a passenger protecting apparatus comprising:

a third collision determining algorithm unit including
an acceleration sensor converting an acceleration at a time of collision into an electrical acceleration signal to output said electrical acceleration signal, a filter allowing only particular frequency in acceleration signals output from said acceleration sensor to pass, first subtracting means for subtracting a first threshold value from an output from said filter, first integrating means for integrating an output from said first subtracting means, having a reset function for forcedly resetting an integrated value to zero when said integrated value is less than zero, and first comparing means for comparing an output from said first integrating means with a second threshold value;

a fourth collision determining algorithm unit including
positive acceleration signal passing means for extracting only an acceleration signal on a positive side in said acceleration signal output from said acceleration sensor, second subtracting means for subtracting a third threshold value from an output from said positive acceleration signal passing means, second integrating means for integrating an output from said second subtracting means, having a reset function for forcedly resetting an integrated value to zero when said integrated value is less than zero, second comparing means for comparing an output from said second integrating means with a fourth threshold value, negative acceleration signal inverting/passing means for extracting only an acceleration signal on a negative side in said acceleration signal output from said acceleration sensor, third subtracting means for subtracting a fifth threshold value from an output from said negative acceleration signal inverting/passing means, third integrating means for integrating an output from said third subtracting means, having a reset function for forcedly resetting an integrated value to zero when said integrated value is less than zero, third comparing means for comparing an output from said third integrating means with a sixth threshold value, and a first AND circuit prohibiting an output from said second comparing means by an output from said third comparing means;

a fifth collision determining algorithm unit including
a second AND circuit obtaining the AND of an output from said third collision determining algorithm unit and an output from said fourth collision determining algorithm unit; and starting means for outputting a starting signal depending upon an output from said fifth collision determining algorithm unit.

3. A starting apparatus of a passenger protecting apparatus comprising:

a first collision determining algorithm unit including
an acceleration sensor converting an acceleration at a time of collision into an electrical acceleration signal to output said electrical acceleration signal, first subtracting means for subtracting a first threshold value from said acceleration signal output from said acceleration sensor, first integrating means for integrating an output from said first subtracting means, having a reset function for forcedly resetting an integrated value to zero when said integrated value is less than zero, and first comparing means for comparing an output from said first integrating means with a second threshold value;

a third collision determining algorithm unit including
a filter allowing only particular frequency in acceleration signals output from said acceleration sensor to pass, second subtracting means for subtracting a third threshold value from an output from said filter, second integrating means for integrating an output from said second subtracting means, having a reset function for forcedly resetting an integrated value to zero when said integrated value is less than zero, and second comparing means for comparing an output from said second integrating means with a fourth threshold value;

a fourth collision determining algorithm unit including
positive acceleration signal passing means for extracting only an acceleration signal on a positive side in said acceleration signal output from said acceleration sensor, third subtracting means for subtracting a fifth threshold value from an output from said positive acceleration signal passing means, third integrating means for integrating an output from said third subtracting means, having a reset function for forcedly resetting an integrated value to zero when said integrated value is less than zero, third comparing means for comparing an output from said third integrating means with a sixth threshold value, negative acceleration signal inverting/passing means for extracting only an acceleration signal on a negative side in said acceleration signal output from said acceleration sensor, fourth subtracting means for subtracting a seventh threshold value from an output from said negative acceleration signal inverting/passing means, fourth integrating means for integrating an output from said fourth subtracting means, having a reset function for forcedly resetting an integrated value to zero when said integrated value is less than zero, fourth comparing means for comparing an output from said fourth integrating means with an eighth threshold value, and a first AND circuit prohibiting an output from said third comparing means by an output from said fourth comparing means;

a fifth collision determining algorithm unit including a second AND circuit obtaining the AND of outputs from said third and fourth collision determining algorithm units;

a sixth collision determining algorithm unit including a third AND circuit obtaining the AND of outputs from said first and fifth collision determining algorithm units; and starting means for outputting a starting signal depending upon an output from said sixth collision determining algorithm unit.

4. A starting apparatus of a passenger protecting apparatus comprising:

a first collision determining algorithm unit including an acceleration sensor converting an acceleration at a time of collision into an electrical acceleration signal to output said electrical acceleration signal, first subtracting means for subtracting a first threshold value from said acceleration signal output from said acceleration sensor, first integrating means for integrating an output from said first subtracting means, having a reset function for forcedly resetting an integrated value to zero when said integrated value is less than zero, and first comparing means for comparing an output from said first integrating means with a second threshold value;

a fourth collision determining algorithm unit including positive acceleration signal passing means for extracting only an acceleration signal on a positive side in said acceleration signal output from said acceleration sensor, second subtracting means for subtracting a third threshold value from an output from said positive acceleration signal passing means, second integrating means for integrating an output from said second subtracting means, having a reset function for forcedly resetting an integrated value to zero when said integrated value is less than zero, second comparing means for comparing an output from said second integrating means with a fourth threshold value, negative acceleration signal inverting/passing means for extracting only an acceleration signal on a negative side in said acceleration signal output from said acceleration sensor, third subtracting means for subtracting a fifth threshold value from an output from said negative acceleration signal inverting/passing means, third integrating means for integrating an output from said third subtracting means, having a reset function for forcedly resetting an integrated value to zero when said integrated value is less than zero, third comparing means for comparing an output from said third integrating means with a sixth threshold value, and a first AND circuit prohibiting an output from said second comparing means by an output from said third comparing means;

a seventh collision determining algorithm unit including a second AND circuit obtaining the AND of outputs from said first and fourth collision determining algorithm units; and starting means for outputting a starting signal depending upon an output from said seventh collision determining algorithm unit.

5. A starting apparatus of a passenger protecting apparatus comprising:

a second collision determining algorithm unit including a low speed determining portion having an acceleration sensor converting an acceleration at a time of collision into an electrical acceleration signal to output said electrical acceleration signal, first subtracting means for subtracting a first threshold value from an acceleration signal output from said acceleration sensor, first integrating means for integrating an output from said first subtracting means, having a reset function for forcedly resetting an integrated value to zero when said integrated value is less than zero, and first comparing means for comparing an output from said first integrating means with a second threshold value;

a high speed determining portion having second subtracting means for a third threshold value from said acceleration signal output from said acceleration sensor, second integrating means for integrating an output from said second subtracting means, having a reset function for forcedly resetting an integrated value to zero when said integrated value is less than zero, and second comparing means for comparing an output from said second integrating means with a fourth threshold value, a first AND circuit obtaining the AND of an output from said low speed determining portion and an output from said high speed determining portion;

a first collision determining algorithm unit including third subtracting means for subtracting a fifth threshold value from said acceleration signal output from said acceleration sensor, third integrating means for integrating an output from said third subtracting means, having a reset function for forcedly resetting an integrated value to zero when said integrated value is less than zero, and third comparing means for comparing an output from said third integrating means with a sixth threshold value;

a third collision determining algorithm unit including a filter allowing only particular frequency in said acceleration signals output from said acceleration sensor to pass, fourth subtracting means for subtracting a sixth threshold value from an output from said filter, fourth integrating means for integrating an output from said fourth subtracting means, having a reset function for forcedly resetting an integrated value to zero when said integrated value is less than zero, and fourth comparing means for comparing an output from said fourth integrating means with a seventh threshold value;

a fourth collision determining algorithm unit including positive acceleration signal passing means for extracting only an acceleration signal on a positive side in said acceleration signal output from said acceleration sensor, fifth subtracting means for subtracting an eighth threshold value from an output from said positive acceleration signal passing means, fifth integrating means for integrating an output from said fifth subtracting means, having a reset function for forcedly resetting an integrated value to zero when said integrated value is less than zero, fifth comparing means for comparing an output from said fifth integrating means with a ninth threshold value, negative acceleration signal inverting/passing means for extracting only an acceleration signal on a negative side in said acceleration signal output from said acceleration sensor, sixth subtracting means for subtracting a tenth threshold value from an output from said negative acceleration signal inverting/passing means, sixth integrating means for integrating an output from said sixth subtracting means, having a reset function for forcedly resetting an integrated value to zero when said integrated value is less than zero, sixth comparing means for comparing an output from said sixth integrating means with an eleventh threshold value, and a second AND circuit prohibiting an output from said fifth comparing means by an output from said sixth comparing means;

a fifth collision determining algorithm unit including a third AND circuit obtaining the AND of outputs from said third and fourth collision determining algorithm units;

a sixth collision determining algorithm unit including a fourth AND circuit obtaining the AND of outputs from said first and fifth collision determining algorithm units;

an eighth collision determining algorithm unit including an OR circuit obtaining the OR of outputs from said second and sixth collision determining algorithm units; and starting means for outputting a starting signal depending upon an output from said eighth collision determining algorithm unit.

* * * * *